US011952059B2

(12) United States Patent
Otsuka et al.

(10) Patent No.: US 11,952,059 B2
(45) Date of Patent: Apr. 9, 2024

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Yusuke Otsuka, Okazaki (JP); Takashi Kodera, Okazaki (JP); Toru Takashima, Susono (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 17/409,091

(22) Filed: Aug. 23, 2021

(65) Prior Publication Data
US 2022/0063711 A1 Mar. 3, 2022

(30) Foreign Application Priority Data

Aug. 25, 2020 (JP) ................................ 2020-142066
Aug. 25, 2020 (JP) ................................ 2020-142067
Aug. 25, 2020 (JP) ................................ 2020-142068

(51) Int. Cl.
*B62D 5/04* (2006.01)
(52) U.S. Cl.
CPC ......... *B62D 5/0463* (2013.01); *B62D 5/0481* (2013.01)
(58) Field of Classification Search
CPC .......................... B62D 5/0463; B62D 5/0481
See application file for complete search history.

(56) References Cited

U.S. PATENT DOCUMENTS 5,992,558 A * 11/1999 Noro ...................... B62D 6/007
701/41
6,152,255 A * 11/2000 Noro ...................... B62D 6/007
180/443
2012/0203430 A1 8/2012 Shimada et al.

FOREIGN PATENT DOCUMENTS

| EP | 2492169 A1 * | 8/2012 | ............. B62D 6/007 |
|----|--------------|--------|---------|
| EP | 2492169 A1 | 8/2012 | |
| JP | H11-29056 A | 2/1999 | |
| JP | 2003-002223 A | 1/2003 | |
| JP | 2013-177045 A | 9/2013 | |
| JP | 2018-158600 A | 10/2018 | |
| JP | 2019-131072 A | 8/2019 | |
| JP | 2020-083058 A | 6/2020 | |
| WO | 2011/048772 A1 | 4/2011 | |

OTHER PUBLICATIONS

Jan. 25, 2022 Search Report issued in European Patent Application No. 21192539.1.
Aug. 22, 2023 Office Action issued in Japanese Application No. 2020-142066.

* cited by examiner

*Primary Examiner* — Jacob D Knutson
(74) *Attorney, Agent, or Firm* — Oliff PLC

(57) ABSTRACT

A steering control device is configured to control a steering system including a turning mechanism that includes a motor configured to generate a motor torque that serves as power for moving a turning shaft to turn turning wheels of a vehicle. The steering control device includes a control unit configured to control a target control value serving as a target of a control value for controlling the motor torque of the motor. The control unit is configured to perform compensation for the target control value; acquire an offset value; and change the target control value such that the acquired offset value decreases gradually.

15 Claims, 16 Drawing Sheets

FIG. 11
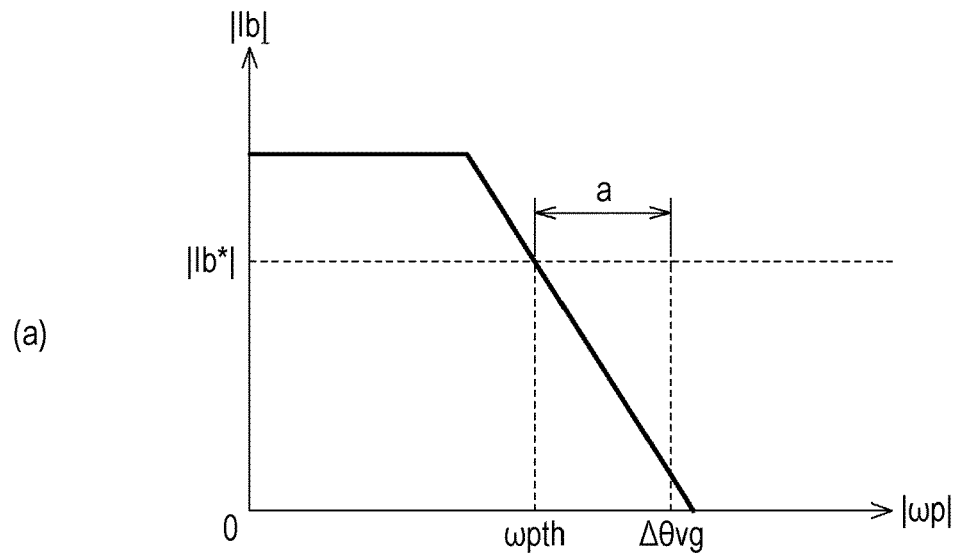
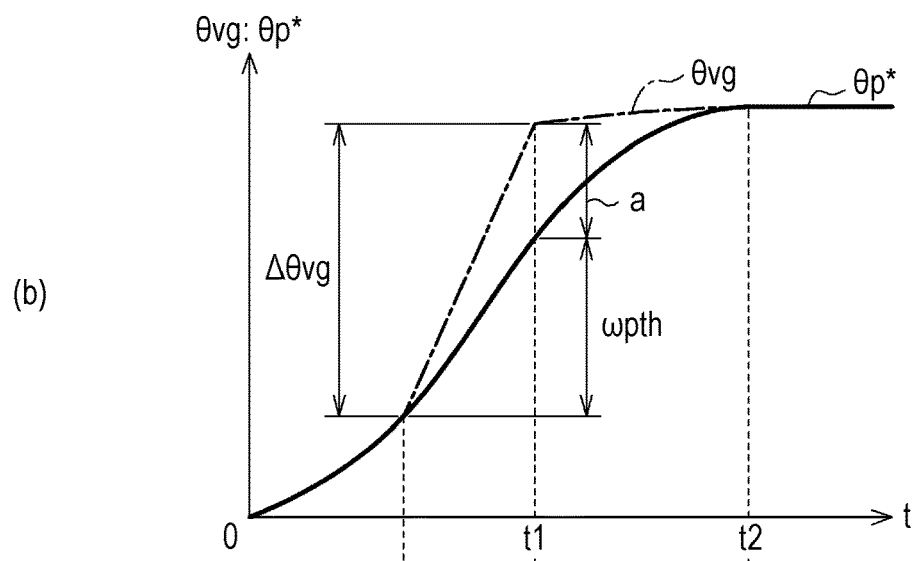
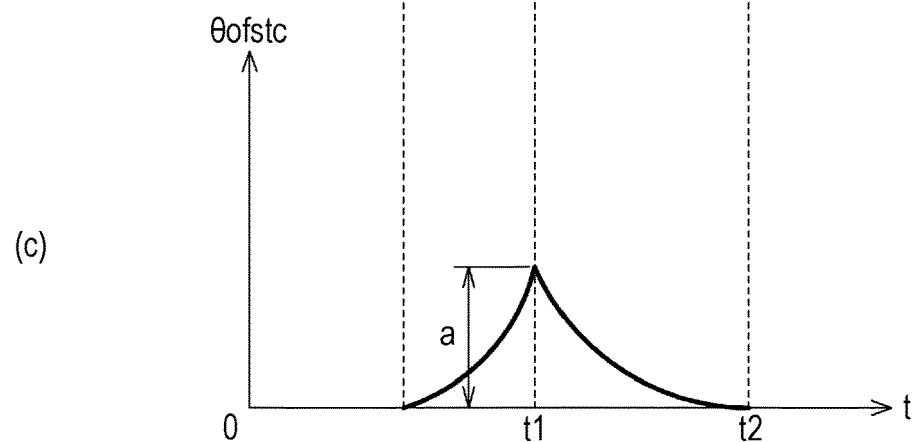

STEERING CONTROL DEVICE

CROSS-REFERENCE TO RELATED APPLICATION

This application claims priority to Japanese Patent Application No. 2020-142066 filed on Aug. 25, 2020, Japanese Patent Application No. 2020-142067 filed on Aug. 25, 2020, and Japanese Patent Application No. 2020-142068 filed on Aug. 25, 2020, each incorporated herein by reference in its entirety.

BACKGROUND

1. Technical Field

The disclosure relates to a steering control device.

2. Description of Related Art

A steering system that is used for a vehicle includes a steering mechanism that enables a steering wheel to operate and a turning mechanism that turns turning wheels of the vehicle by moving a turning shaft using a motor torque which is an output of a motor as power. Japanese Unexamined Patent Application Publication No. 2019-131072 (JP 2019-131072 A) discloses an example of a steering system having a structure in which a power transmission path between the steering mechanism and the turning mechanism is cut off, that is, a steer-by-wire steering system.

JP 2019-131072 A discloses that a steering angle which is an angle to which the steering wheel is operated is detected as a state of the steering mechanism. The detected steering angle is used to calculate a target control value which serves as a target of a control value for controlling an output of a motor provided in the turning mechanism.

SUMMARY

In the aforementioned steering system, a plurality of control states in which the target control value of the turning mechanism is controlled can be prepared. It is possible to maintain a desired function in the steering system while switching the control state between the plurality of control states. For example, the control state can be switched to a backup control state for controlling the target control value such that the target control value can be controlled even when any abnormality occurs.

However, in the aforementioned case, a difference in the target control value may occur between before and after the control state is switched. In this case, the turning mechanism may perform an operation which is not intended by a driver. This gives discomfort to the driver.

Here, the target control value of the turning mechanism is calculated to be a control value based on a steering angle detected by the steering mechanism. However, for example, a control value exceeding an output limit of the motor may be calculated as the target control value when the steering angle changes suddenly. In this case, the motor may cause vibration or noise due to an output exceeding the output limit.

In a steer-by-wire steering system, the turning wheels are not turned even when the steering wheel is steered while an ignition switch is in an OFF state, and a positional relationship between the steering wheel and the turning wheels departs from a predetermined correspondence when the steering wheel is steered. In this case, the turning wheels may operate suddenly to reach a position corresponding to the steering angle after the ignition switch is switched from the OFF state to an ON state. This gives discomfort to the driver.

The disclosure provides a steering control device that can curb discomfort given to a driver.

The disclosure also provides a steering control device that can curb generation of vibration or noise in a motor.

An aspect of the disclosure relates to a steering control device configured to control a steering system including a turning mechanism that includes a motor configured to generate a motor torque that serves as power for moving a turning shaft to turn turning wheels of a vehicle. The steering control device includes a control unit configured to control a target control value serving as a target of a control value for controlling the motor torque of the motor. The control unit is configured to perform compensation for the target control value; acquire an offset value; and change the target control value such that the acquired offset value decreases gradually.

In the aspect, the control unit may be configured to be able to switch between a plurality of control states including a first control state in which a first target control value acquired under a predetermined condition is controlled and a second control state in which a second target control value acquired under a condition different from the predetermined condition of the first target control value is controlled, and to perform the compensation such that a post-switching target control value controlled in a post-switching control state is shifted toward a pre-switching target control value controlled in a pre-switching control state after the control state has been switched. The control unit may be configured to acquire a difference in the target control value between before and after switching of the control state, as the offset value that is an amount by which the target control value is shifted through the compensation, when the control state is switched.

With this configuration, when the control state is switched, the post-switching target control value is shifted toward the pre-switching target control value such that the difference from the pre-switching target control value is cancelled out through the compensation using the offset value. Particularly at the moment at which the control state is switched, the compensation is performed such that the post-switching target control value almost (substantially) matches the pre-switching target control value. Thereafter, since the offset value decreases gradually, the post-switching target control value approaches the original target control value which is acquired through calculation in the post-switching control state, and eventually reaches the original target control value. Accordingly, even when there is a difference in the target control value between before and after switching of the control state, this difference can be prevented from appearing as movement of the turning mechanism which is not intended by a driver. As a result, it is possible to curb discomfort given to the driver.

As described above, by employing the configuration of switching the control state, it is considered that a control state for backup is prepared to cope with a possible abnormality and to maintain desired functions in the steering system at the time of occurrence of such an abnormality.

In the aspect, the first target control value may be calculated under the condition in which a first state variable detected by a first detection device is used; the second target control value may be calculated under the condition in which a second state variable detected by a second detection device is used; and the first detection device and the second detection device may be redundant detection devices that respectively detect independent state variables of a same detection target.

With this configuration, when an abnormality occurs in the first detection device, the control state can be switched to the second control state for backup for calculating the target control value based on a result of detection from the redundant second detection device. This is for avoiding calculating the target control value based on the result of detection from the first detection device. In this case, even when there is a difference in the state variable between before and after switching of the control state, the target control value after the control state has been switched can be prevented from causing a difference from the pre-switching target control value. Accordingly, even when the control state is switched to the control state for backup due to occurrence of an abnormality in the first detection device, it is possible to curb movement of the turning mechanism which is not intended by a driver.

In the aspect, the control unit may be configured to perform the compensation such that the target control value is shifted into an output limit of the motor, when the target control value exceeding the output limit is calculated; and the control unit may be configured to acquire an excess control value that is a control value corresponding to an excess over the output limit of the motor, as the offset value that is an amount by which the target control value is shifted through the compensation, when the target control value exceeding the output limit is calculated.

With this configuration, when the target control value exceeding the output limit of the motor is calculated, the target control value is shifted into the output limit of the motor through the compensation using the offset value. Thereafter, as the offset value decreases gradually, the target control value approaches the original target control value and eventually reaches the original target control value. Accordingly, even when the target control value exceeding the output limit of the motor is calculated, it is possible to make it difficult to cause a situation in which the motor outputs power greater than the output limit (i.e., a situation in which the motor outputs power greater than the output limit is unlikely to be caused). As a result, it is possible to curb generation of vibration or noise in the motor.

In the aspect, the output limit may be a value associated with an angular velocity of the motor that is acquired from a relationship with the motor torque of the motor; the target control value may be a value associated with a state variable that is able to be converted to the angular velocity of the motor; and the control unit may be configured to acquire, as the offset value, the excess control value acquired from a difference between the output limit of the motor and a change amount of the target control value, when the target control value exceeding the output limit is calculated.

With this configuration, it is possible to appropriately make it difficult to cause a situation in which the motor outputs power greater than the output limit.

In the aspect, the control unit may be configured to perform the compensation such that the target control value is shifted to decrease the motor torque of the motor, when a vehicle power supply is switched from an off state to an on state; and the control unit may be configured to acquire a control value corresponding to an amount by which the turning wheels are to be turned in a first cycle after the vehicle power supply is switched from the off state to the on state, as the offset value that is an amount by which the target control value is shifted through the compensation, when the vehicle power supply is switched from the off state to the on state.

With this configuration, when the target control value is calculated in the case where the turning wheels are to be turned (i.e., should be turned) in the first cycle after the vehicle power supply is switched from the off state to the on state, the target control value is shifted to decrease the motor torque of the motor such that the turning wheels do not move suddenly, through the compensation using the offset value. Thereafter, as the offset value decreases gradually, the target control value approaches the original target control value and eventually reaches the original target control value. Accordingly, even when the target control value is calculated in the case where the turning wheels are to be turned (i.e., should be turned) in the first cycle after the vehicle power supply is switched from the off state to the on state, it is possible to curb sudden movement of the turning wheels in the first cycle after the switching. As a result, it is possible to curb discomfort given to a driver.

In the aspect, the steering system may further include a steering shaft configured such that a power transmission path between the steering shaft and the turning wheels is cut off, the steering shaft being configured to rotate in accordance with an operation of a steering wheel. The target control value may be a target angle that is calculated as a value of a turning correlation angle having a correlation with a turning angle of the turning wheels at which a positional relationship with a steering angle that is a rotation angle of the steering shaft satisfies a predetermined correspondence. The control unit may be configured to acquire, as the offset value, a starting shift value that is a difference between a value of the turning correlation angle acquired to satisfy the predetermined correspondence based on the steering angle in the first cycle after the vehicle power supply is switched from the off state to the on state and a value of the turning correlation angle acquired based on an actual turning angle.

For example, in the case where the steering system further includes a steering shaft configured such that a power transmission path between the steering shaft and the turning wheels is cut off, and the steering shaft is configured to rotate in accordance with an operation of a steering wheel, the positional relationship between the steering angle and the turning angle departs from the predetermined correspondence when the steering wheel is steered while the vehicle power supply is in the off state. On the other hand, with the aforementioned configuration, even when the vehicle power supply is switched from the off state to the on state in a state in which the positional relationship between the steering angle and the turning angle departs from the predetermined correspondence, it is possible to reduce the possibility that the turning wheels suddenly move such that the turning angle reaches a position corresponding to the steering angle in the first cycle after the switching.

In the aspect, the predetermined correspondence may be a steering angle ratio that is a ratio of the turning angle to the steering angle, and the predetermined correspondence may vary based on a traveling state of the vehicle.

When a configuration for changing the steering angle ratio is provided as in the aforementioned configuration, it is particularly effective to acquire, as the offset value, the starting shift value which is a difference between the value of the turning correlation angle acquired to satisfy the predetermined correspondence based on the steering angle in the first cycle after the vehicle power supply is switched from the off state to the on state and the value of the turning correlation angle acquired based on the actual turning angle.

Here, since the offset value is acquired for forcibly shifting the post-switching target control value, it is preferable to cancel out the offset value as soon as possible, but movement of the turning mechanism which is not intended by a driver appears eventually when a decrease value of the offset value is set to be excessively large.

Therefore, in the aspect, the control unit may be configured to change a decrease value for decreasing the offset value based on at least one of a traveling state of the vehicle and a turning state of the turning mechanism.

For example, in a traveling state in which the vehicle is traveling at a relatively high speed or in a turning state in which the turning mechanism is performing turning, even when the decrease value for decreasing the offset value is set to a large value and thus movement of the turning mechanism which is not intended by a driver appears, a driver is not likely to have a feeling of discomfort. Therefore, with the aforementioned configuration, it is possible to effectively cancel out the offset value as soon as possible while curbing discomfort given to the driver by considering the traveling state of the vehicle or the turning state of the turning mechanism.

In the aspect, the control unit may be configured to decrease the offset value by at least a minimum value regardless of the traveling state of the vehicle and the turning state of the turning mechanism, when there is the offset value.

With this configuration, it is possible to prevent the offset value from being constantly left, and it is possible to effectively reduce the offset value.

With the steering control device according to the aspect of the disclosure, it is possible to curb discomfort given to a driver. With the steering device according to the aspect of the disclosure, it is possible to curb generation of vibration or noise in the motor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

Figure 5:
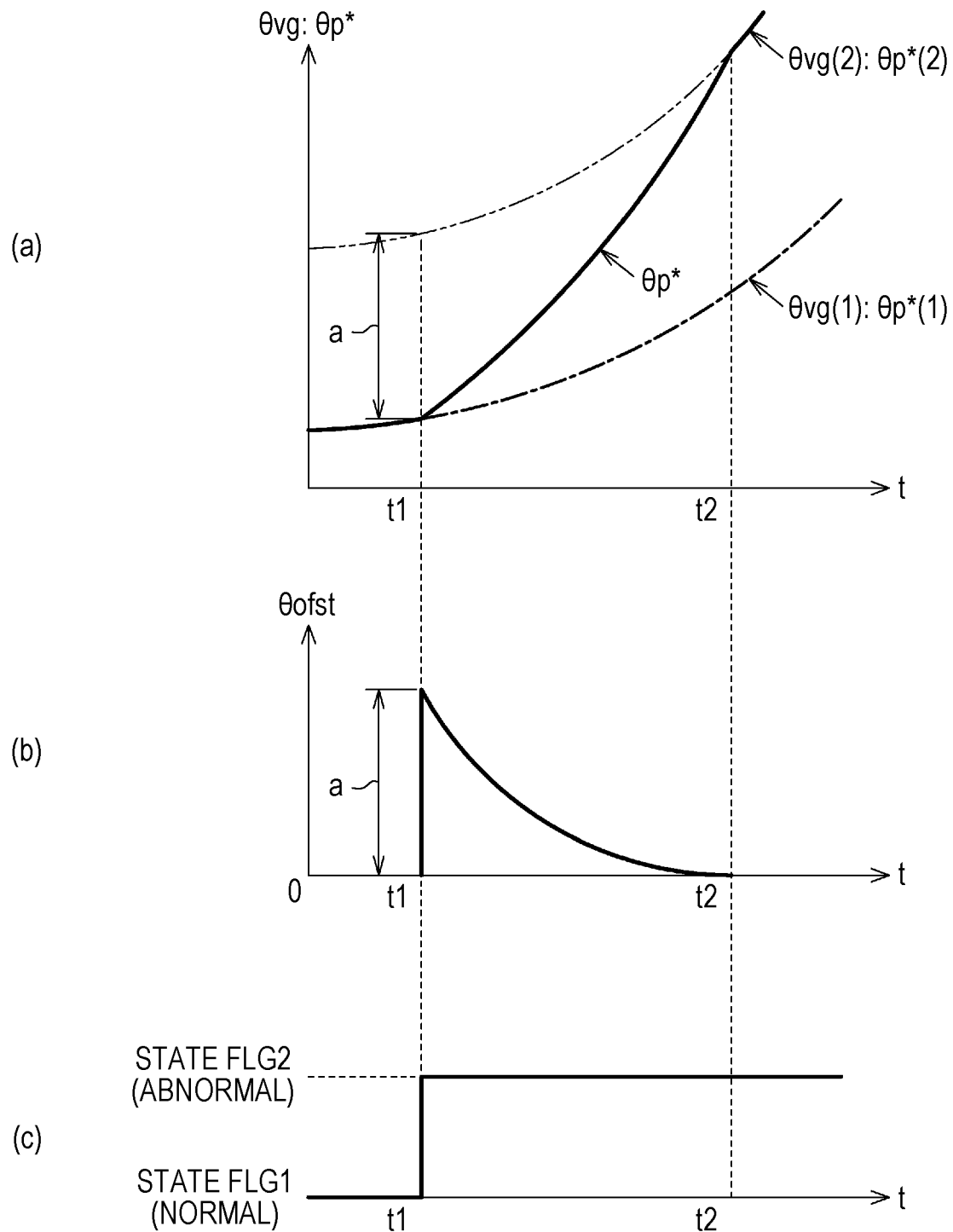
Figure 6:
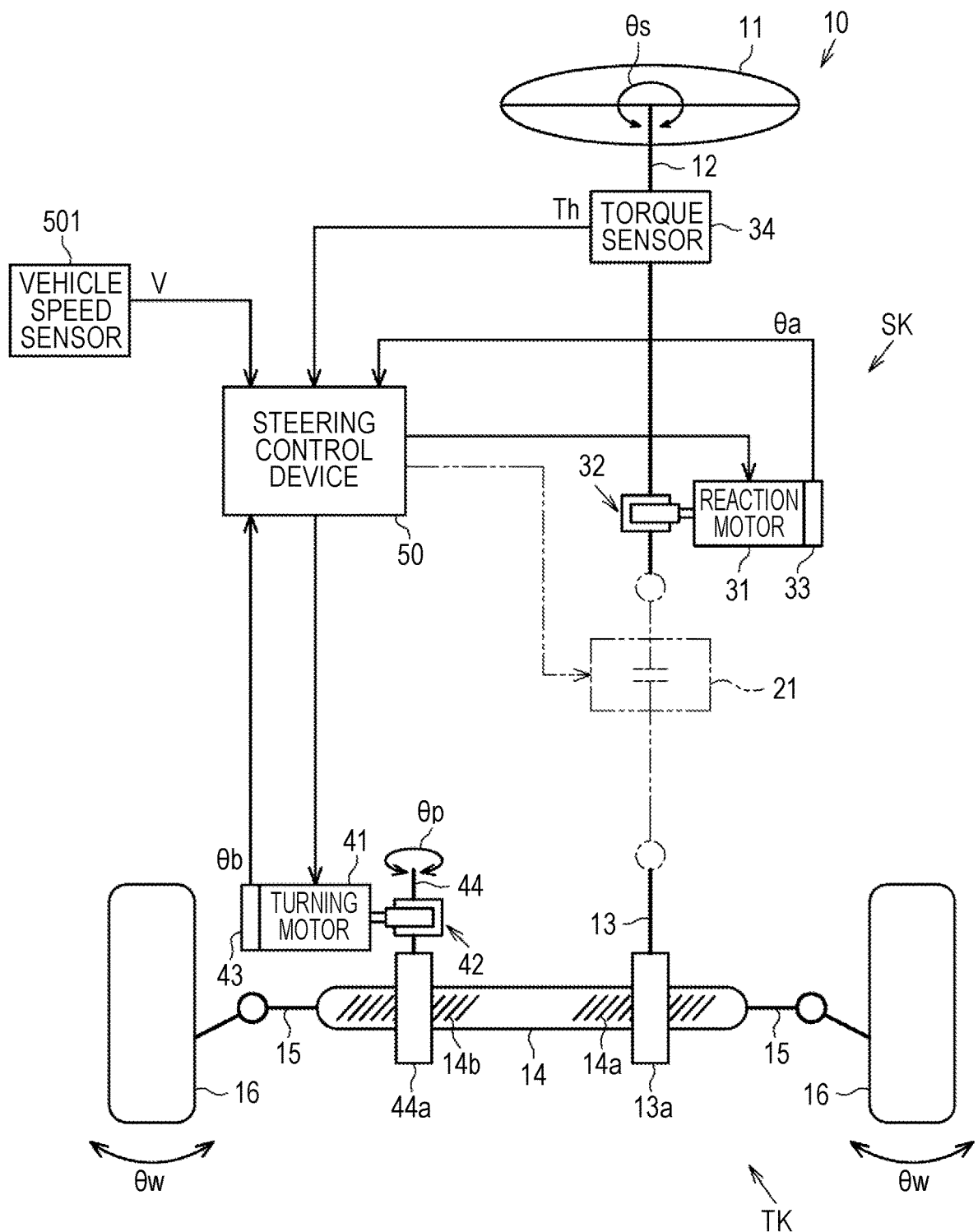
Figure 7:
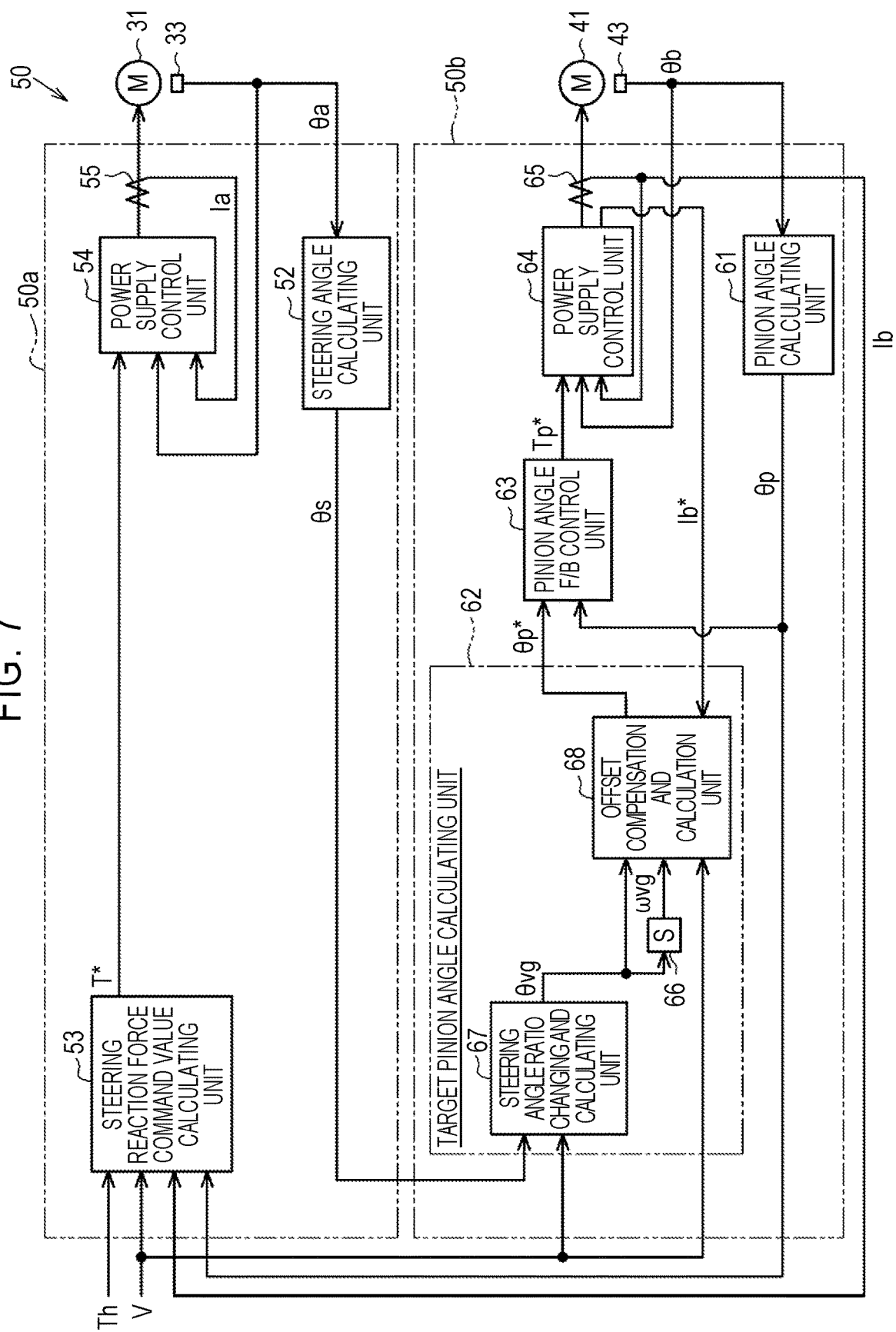
Figure 8:
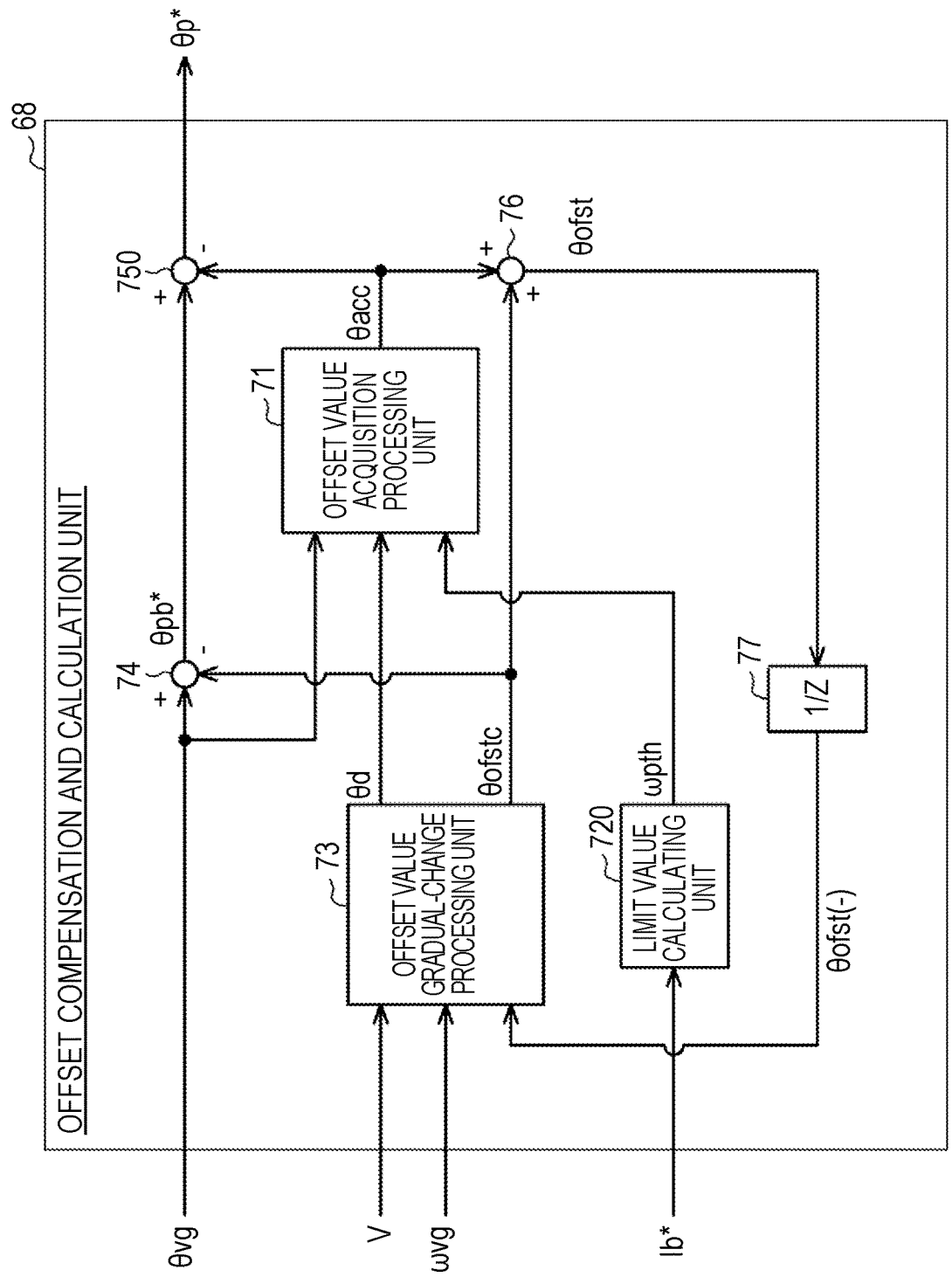
Figure 9:
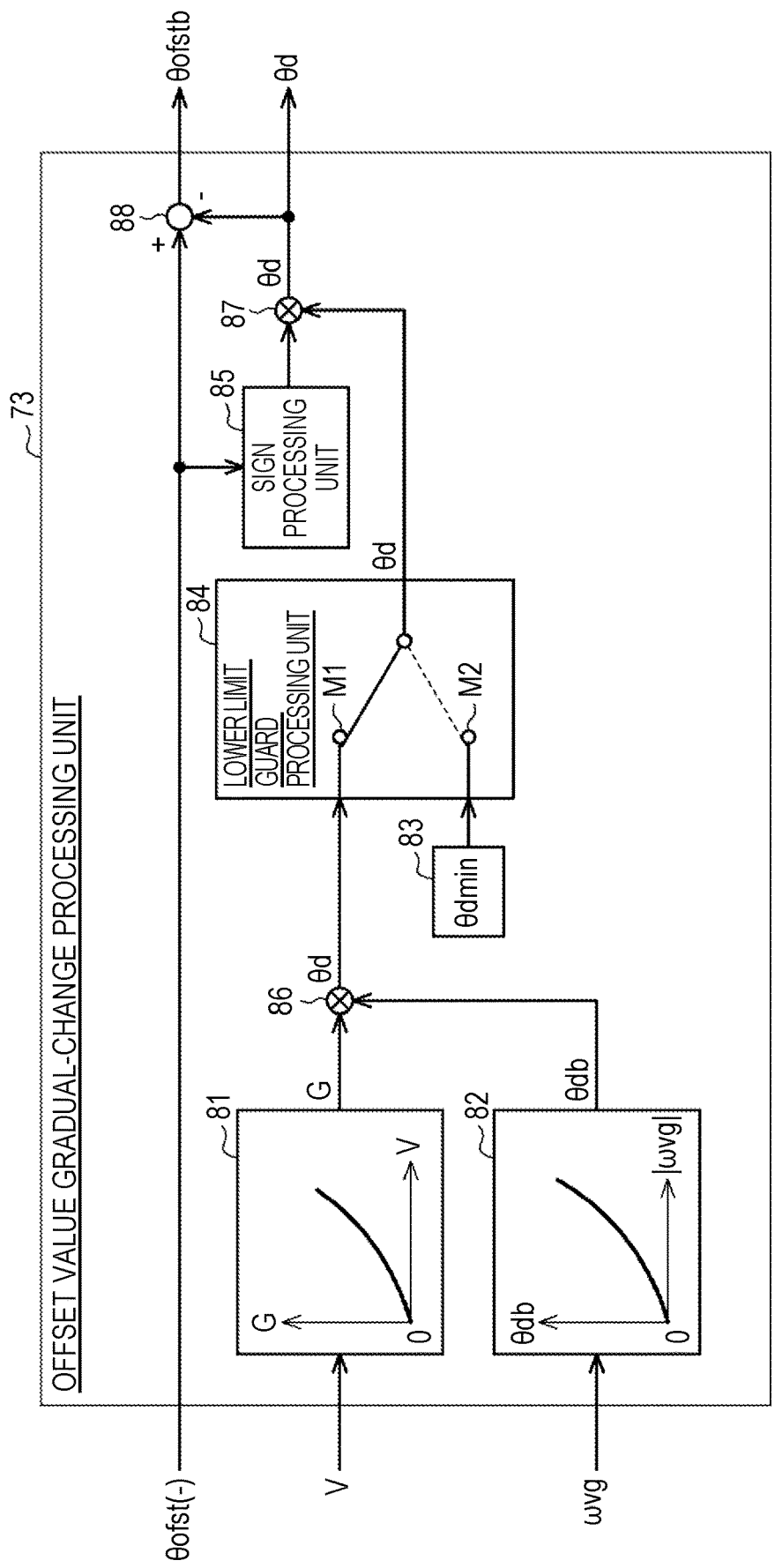
Figure 10:
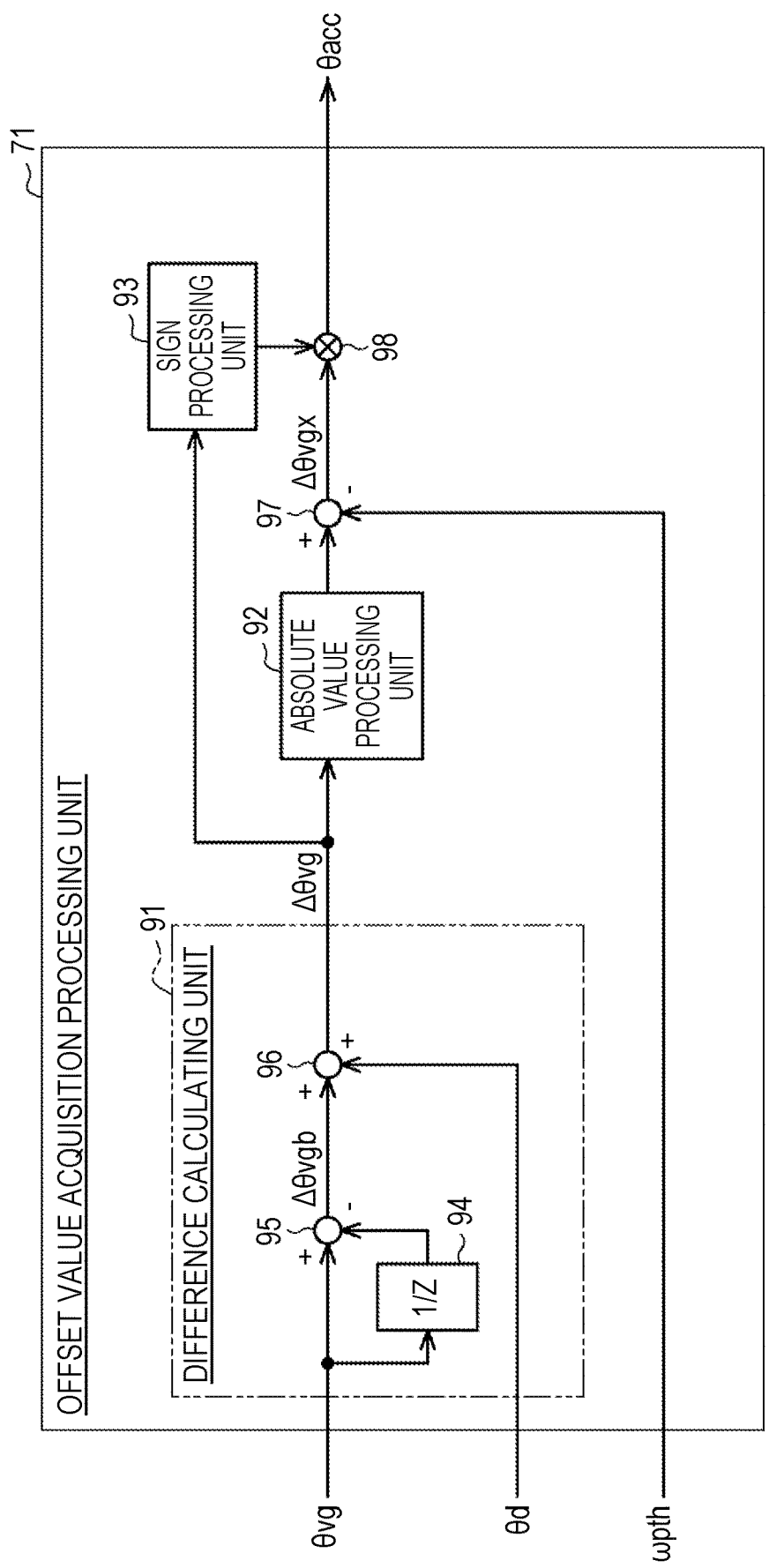
Figure 12:
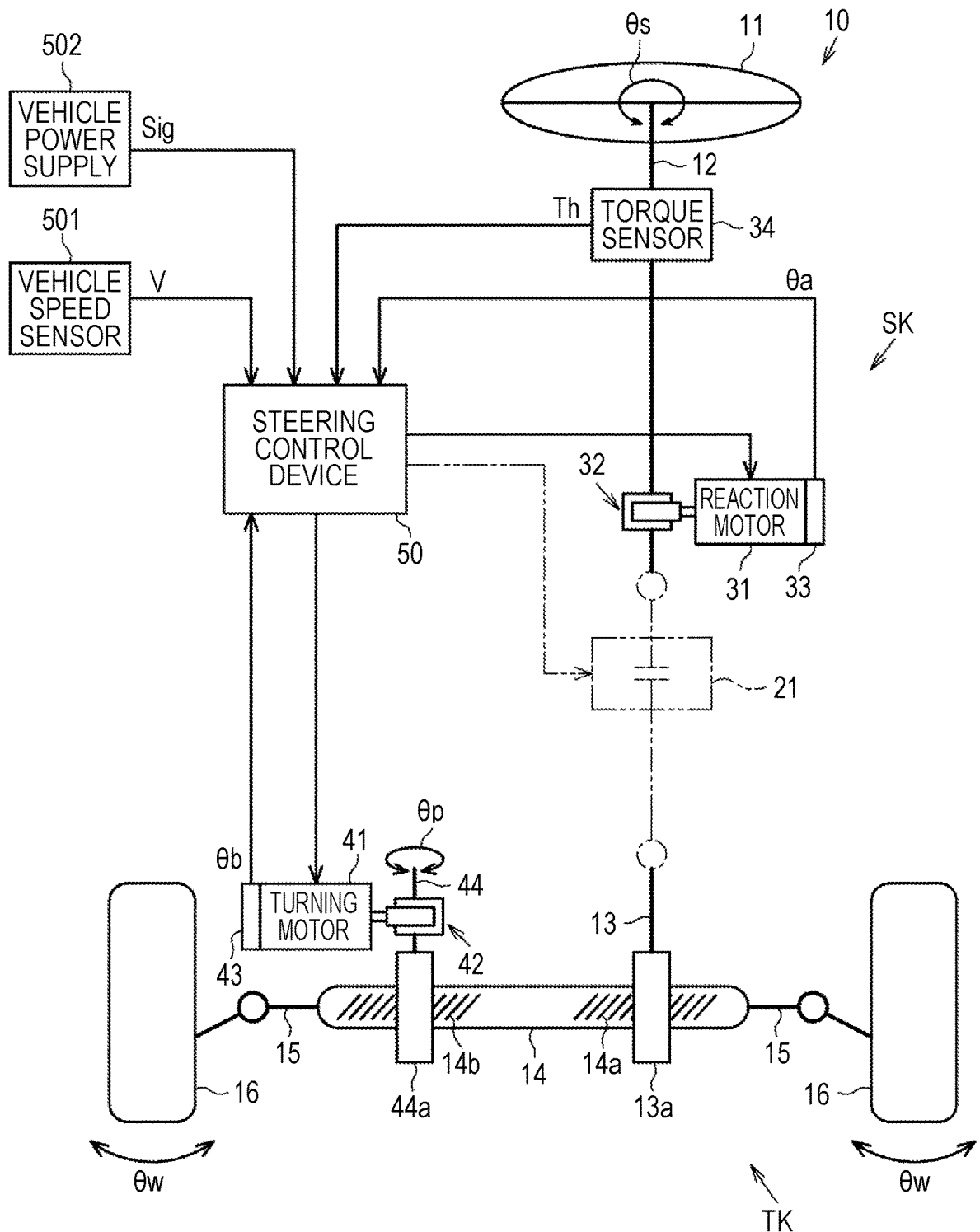
Figure 13:
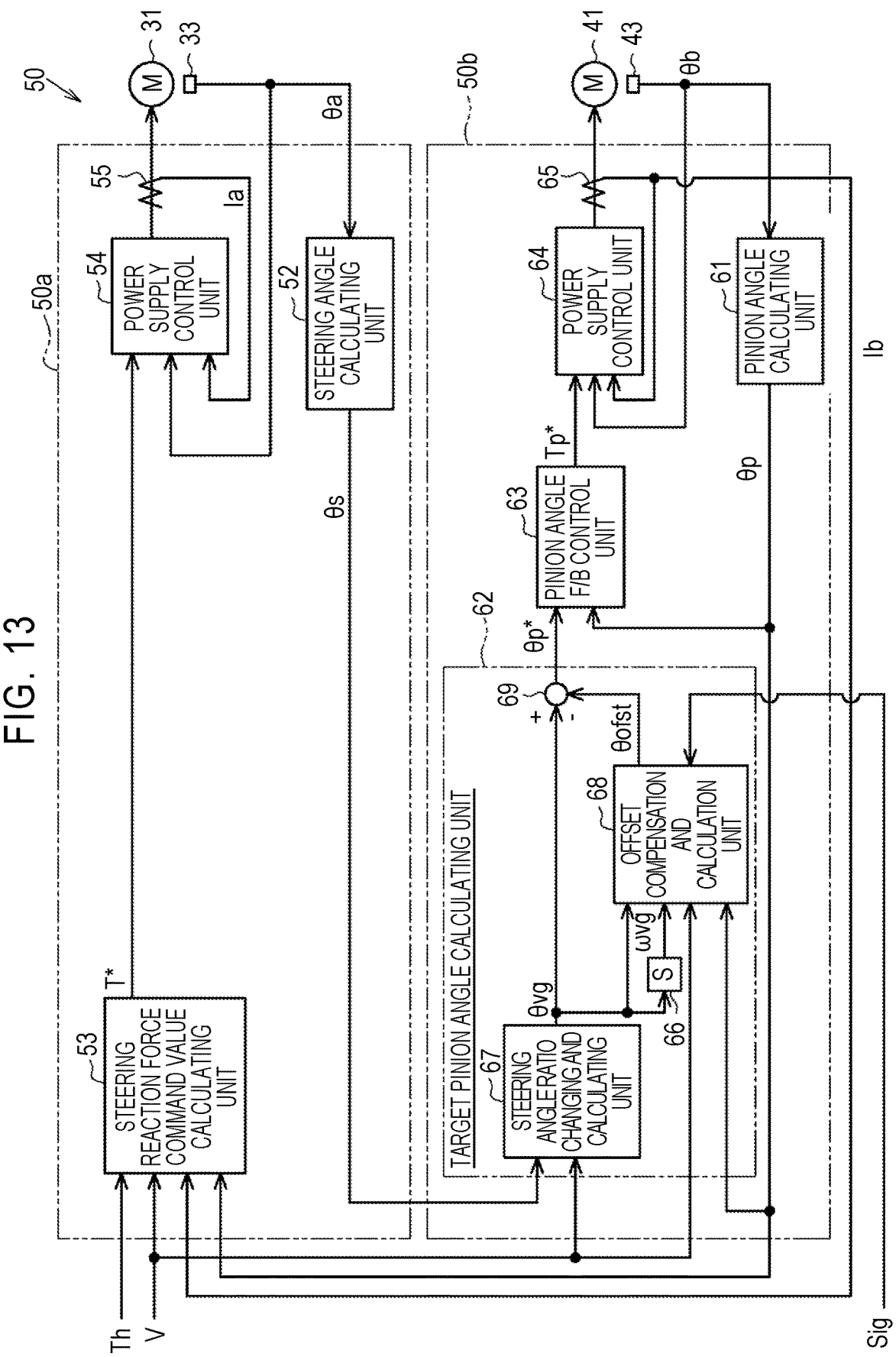
Figure 14:
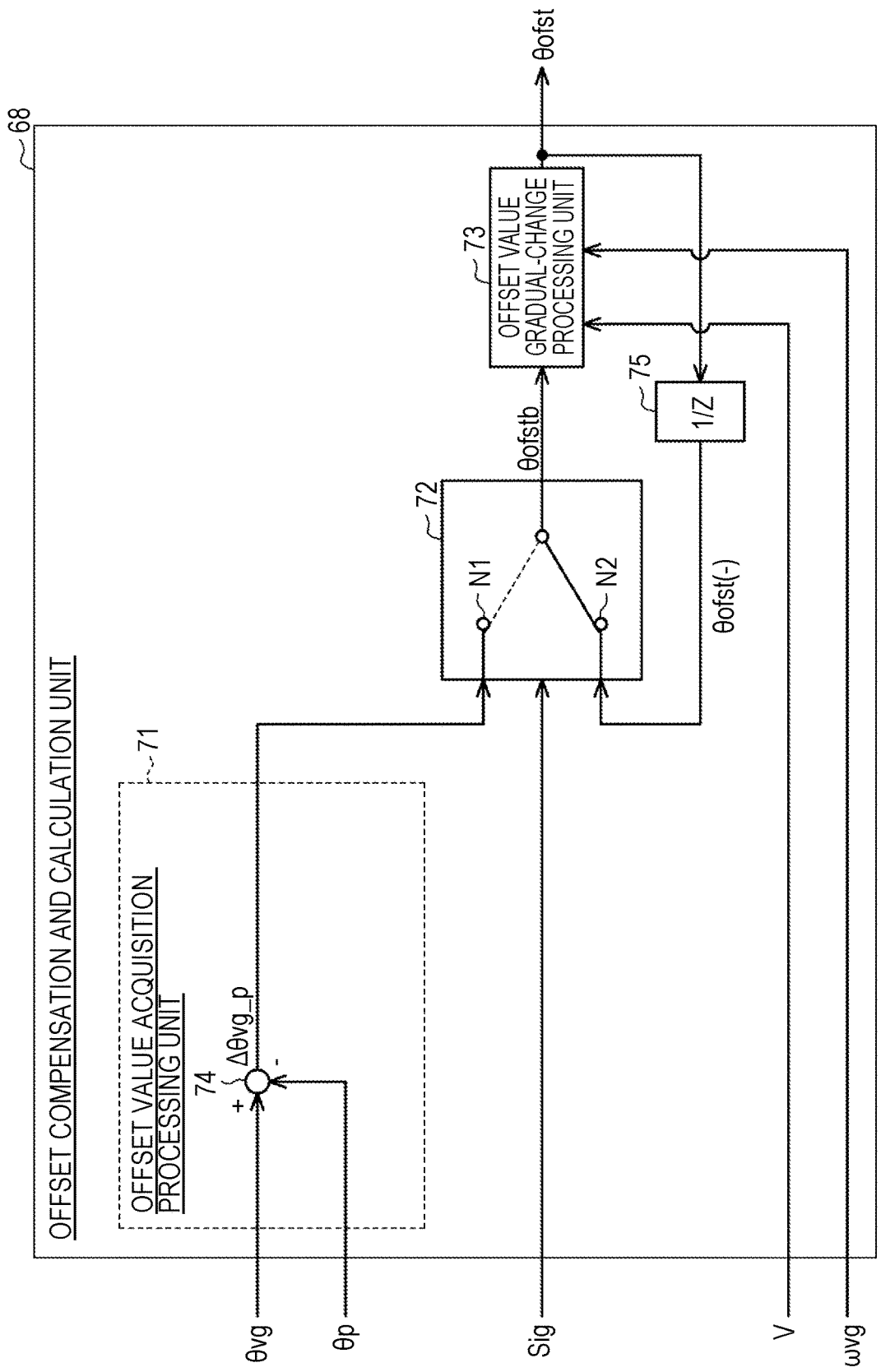
Figure 15:
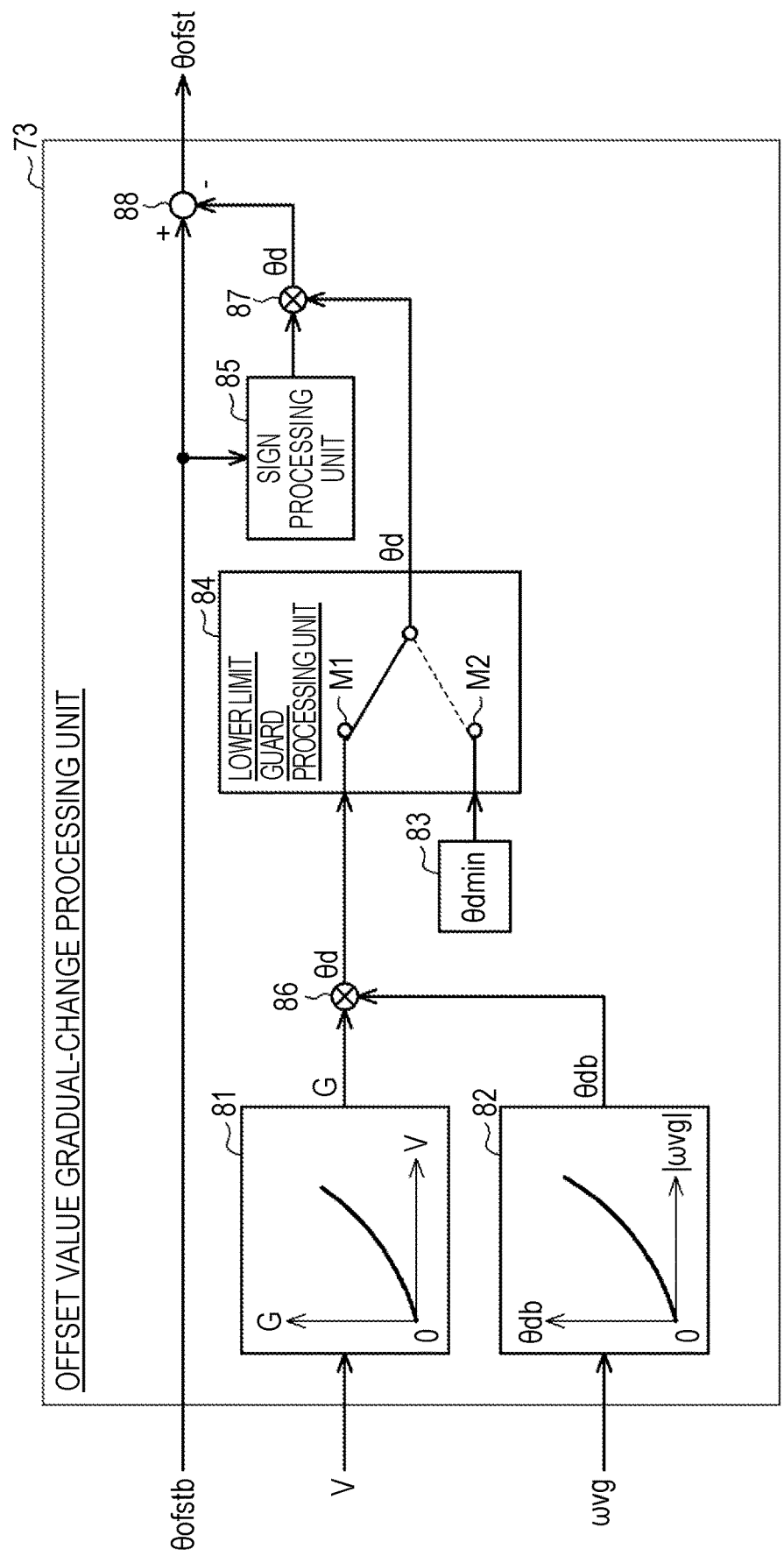
Figure 16:
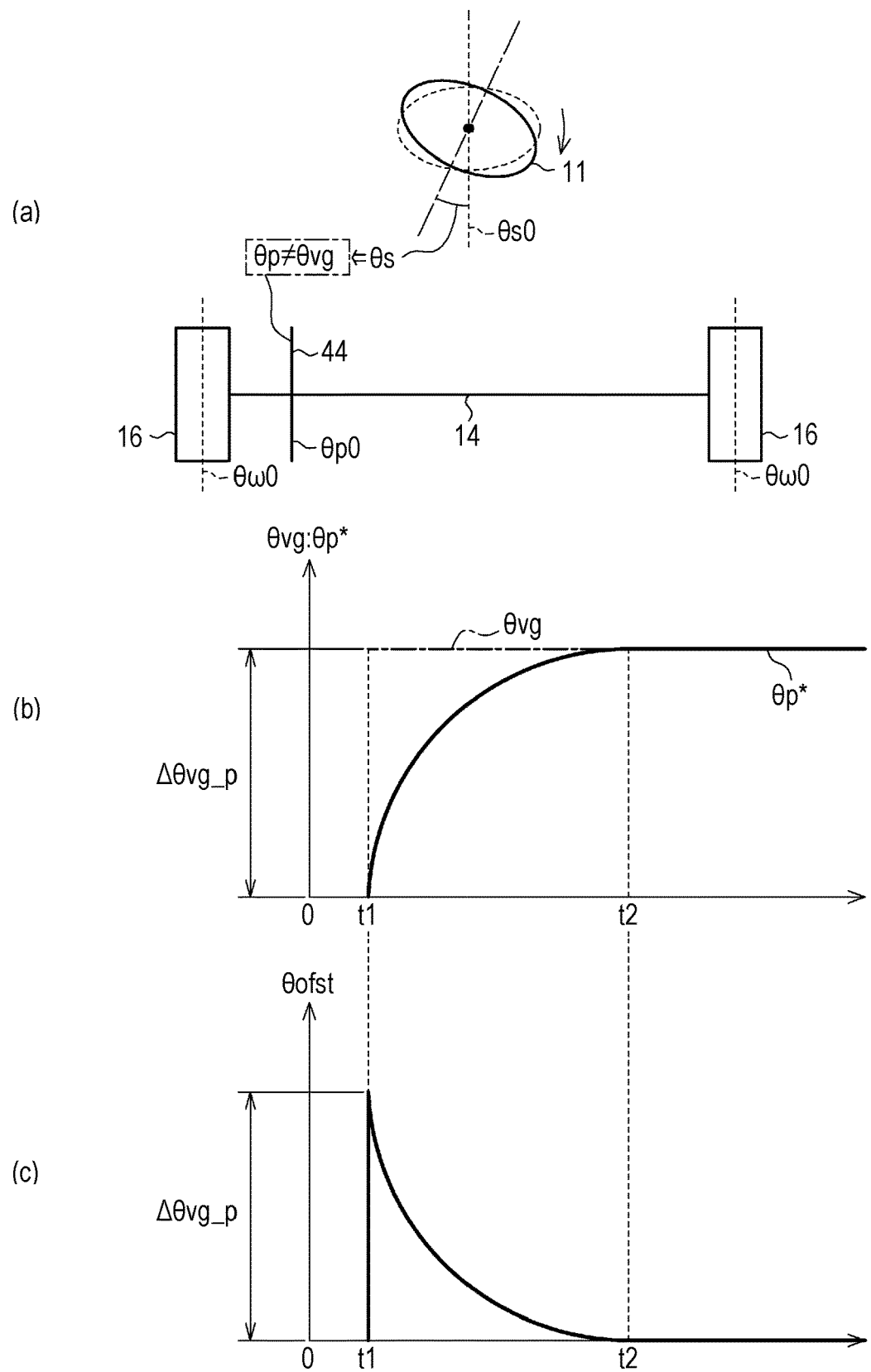

A portion (a) in FIG. 5 is a diagram schematically illustrating a change mode of a target pinion angle according to the first embodiment, a portion (b) in FIG. 5 is a diagram schematically illustrating a change mode of an offset value according to the first embodiment, and a portion (c) in FIG. 5 is a diagram schematically illustrating a change mode of a state flag FLG according to the first embodiment;

FIG. 6 is a diagram schematically illustrating a configuration of a steering system according to a second embodiment;

FIG. 7 is a block diagram illustrating functions of a steering control device according to the second embodiment;

FIG. 8 is a block diagram illustrating functions of an offset compensation and calculation unit according to the second embodiment;

FIG. 9 is a block diagram illustrating a functions of an offset value gradual-change processing unit according to the second embodiment;

FIG. 10 is a block diagram illustrating a functions of an offset value acquisition processing unit according to the second embodiment;

A portion (a) in FIG. 11 is a diagram schematically illustrating a situation of an output limit of a turning motor according to the second embodiment, a portion (b) in FIG. 11 is a diagram schematically illustrating a change mode of a target pinion angle according to the second embodiment, and a portion (c) in FIG. 11 is a diagram schematically illustrating a change mode of an offset value according to the second embodiment;

FIG. 12 is a diagram schematically illustrating a configuration of a steering system according to a third embodiment;

FIG. 13 is a block diagram illustrating functions of a steering control device according to the third embodiment;

FIG. 14 is a block diagram illustrating functions of an offset compensation and calculation unit according to the third embodiment;

FIG. 15 is a block diagram illustrating a functions of an offset value gradual-change processing unit according to the third embodiment; and A portion (a) in FIG. 16 is a diagram schematically illustrating a situation in which a positional relationship between a steering wheel and turning wheels departs from a predetermined correspondence according to the third embodiment, a portion (b) in FIG. 16 is a diagram schematically illustrating a change mode of a target pinion angle according to the third embodiment, and a portion (c) in FIG. 16 is a diagram schematically illustrating a change mode of an offset value according to the third embodiment.

DETAILED DESCRIPTION OF EMBODIMENTS

First Embodiment

Figure 1:
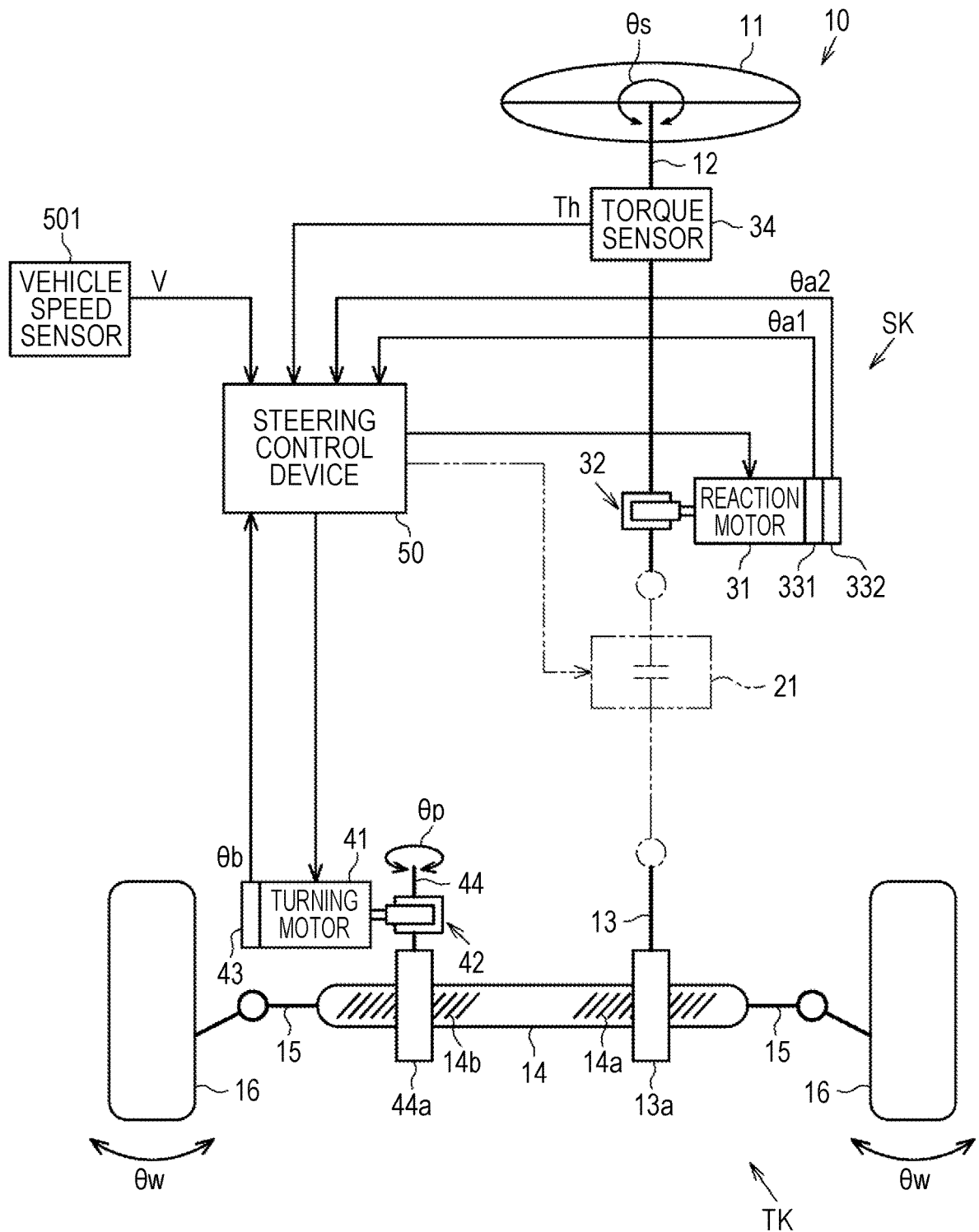
FIG. 1 is a diagram schematically illustrating a configuration of a steering system according to a first embodiment.

Hereinafter, a first embodiment in which a steering control device is applied to a steer-by-wire steering system will be described with reference to the accompanying drawings. As illustrated in FIG. 1, a steering system 10 of a vehicle is a steer-by-wire steering system. The steering system 10 includes a steering control device 50 that controls operation of the steering system 10. The steering system 10 includes a steering mechanism SK that is steered by a driver via a steering wheel 11 and a turning mechanism TK that turns turning wheels 16 in accordance with a driver's steering of the steering mechanism SK. The steering system 10 according to this embodiment has a structure in which a power transmission path between the steering mechanism SK and the turning mechanism TK is normally mechanically cut off.

The steering mechanism SK includes a steering shaft 12 that is connected to the steering wheel 11. The turning mechanism TK includes a turning shaft 14 that extends in a vehicle width direction which is a right-left direction in FIG. 1. Right and left turning wheels 16 are respectively connected to both ends of the turning shaft 14 via tie rods 15. When the turning shaft 14 moves linearly, a turning angle $\theta w$ which is a turning angle of the turning wheels 16 is changed.

The steering mechanism SK includes a reaction motor 31, a reduction gear mechanism 32, a first rotation angle sensor 331, a second rotation angle sensor 332, and a torque sensor 34 as a configuration for generating a steering reaction force. A steering reaction force is a force which acts in a direction opposite to an operating direction of the steering wheel 11 by a driver. An appropriate feeling of response can be given to the driver by applying the steering reaction force to the steering wheel 11.

The reaction motor 31 is a source of the steering reaction force. For example, a three-phase brushless motor is employed as the reaction motor 31. The reaction motor 31, accurately, a rotation shaft thereof, is connected to the steering shaft 12 via the reduction gear mechanism 32. A torque of the reaction motor 31 is applied as a steering reaction force to the steering shaft 12.

The rotation angle sensors 331 and 332 are provided in the reaction motor 31. The first rotation angle sensor 331 detects a rotation angle θa1 of the reaction motor 31. The second rotation angle sensor 332 detects a rotation angle θa2 of the reaction motor 31. The rotation angle sensors 331 and 332 are redundant rotation angle sensors that detect independent rotation angles with a rotation angle of the same reaction motor 31 serving as a detection target. In other words, the rotation angle sensors 331 and 332 respectively detect independent state variables of the same detection target. The rotation angles θa1 and θa2 of the reaction motor 31 are used to calculate a steering angle θs. The reaction motor 31 and the steering shaft 12 operate in conjunction with each other via the reduction gear mechanism 32. Accordingly, the rotation angles θa1 and θa2 of the reaction motor 31 and the rotation angle of the steering shaft 12, that is, a steering angle θs which is a rotation angle of the steering wheel 11, have a correlation therebetween. As a result, the steering angle θs can be calculated on the basis of the rotation angles θa1 and θa2 of the reaction motor 31. The first rotation angle sensor 331 is an example of a first detection device and the rotation angle θa1 detected thereby is an example of a first state variable. The second rotation angle sensor 332 is an example of a second detection device and the rotation angle θa2 detected thereby is an example of a second state variable.

The torque sensor 34 detects a steering torque Th which is applied to the steering shaft 12 through an operation of rotating the steering wheel 11. The torque sensor 34 is provided in the steering shaft 12 at a position closer to the steering wheel 11 than the reduction gear mechanism 32 is.

The turning mechanism TK includes a turning motor 41, a reduction gear mechanism 42, and a rotation angle sensor 43 as a configuration for generating a turning force which is power for turning the turning wheels 16. The turning motor 41 is a source of the turning force. For example, a three-phase brushless motor is employed as the turning motor 41. A rotation shaft of the turning motor 41 is connected to a pinion shaft 44 via the reduction gear mechanism 42. Pinion teeth 44a of the pinion shaft 44 engage with rack teeth 14b of the turning shaft 14. A torque of the turning motor 41 is applied as a turning force to the turning shaft 14 via the pinion shaft 44. With rotation of the turning motor 41, the turning shaft 14 moves in a vehicle width direction which is a right-left direction in FIG. 1.

The rotation angle sensor 43 is provided in the turning motor 41. The rotation angle sensor 43 detects a rotation angle θb of the turning motor 41. The steering system 10 includes a pinion shaft 13. The pinion shaft 13 is provided to cross the turning shaft 14. Pinion teeth 13a of the pinion shaft 13 engage with rack teeth 14a of the turning shaft 14. The reason why the pinion shaft 13 is provided is that the turning shaft 14 along with the pinion shaft 44 is supported in a housing which is not illustrated. That is, by a support mechanism (not illustrated) which is provided in the steering system 10, the turning shaft 14 is supported to be movable in an axial direction thereof and is pressed toward the pinion shafts 13 and 44. Accordingly, the turning shaft 14 is supported in the housing. Another support mechanism that supports the turning shaft 14 in the housing without using the pinion shaft 13 may be provided.

As illustrated in FIG. 1, a steering control device 50 that controls driving of the motors 31 and 41 is connected to the reaction motor 31 and the turning motor 41. The steering control device 50 controls driving of the motors 31 and 41 by controlling supply of currents which are control values of the motors 31 and 41 based on results of detection from various sensors. Examples of the various sensors include a vehicle speed sensor 501, the torque sensor 34, the rotation angle sensors 331 and 332, and the rotation angle sensor 43. The vehicle speed sensor 501 detects a vehicle speed V which is a traveling speed of the vehicle.

The configuration of the steering control device 50 will be described below. The steering control device 50 includes a central processing unit (CPU) and a memory which are not illustrated and the CPU executes a program stored in the memory at intervals of a predetermined operation cycle. Accordingly, various processes are performed.

Figure 2:
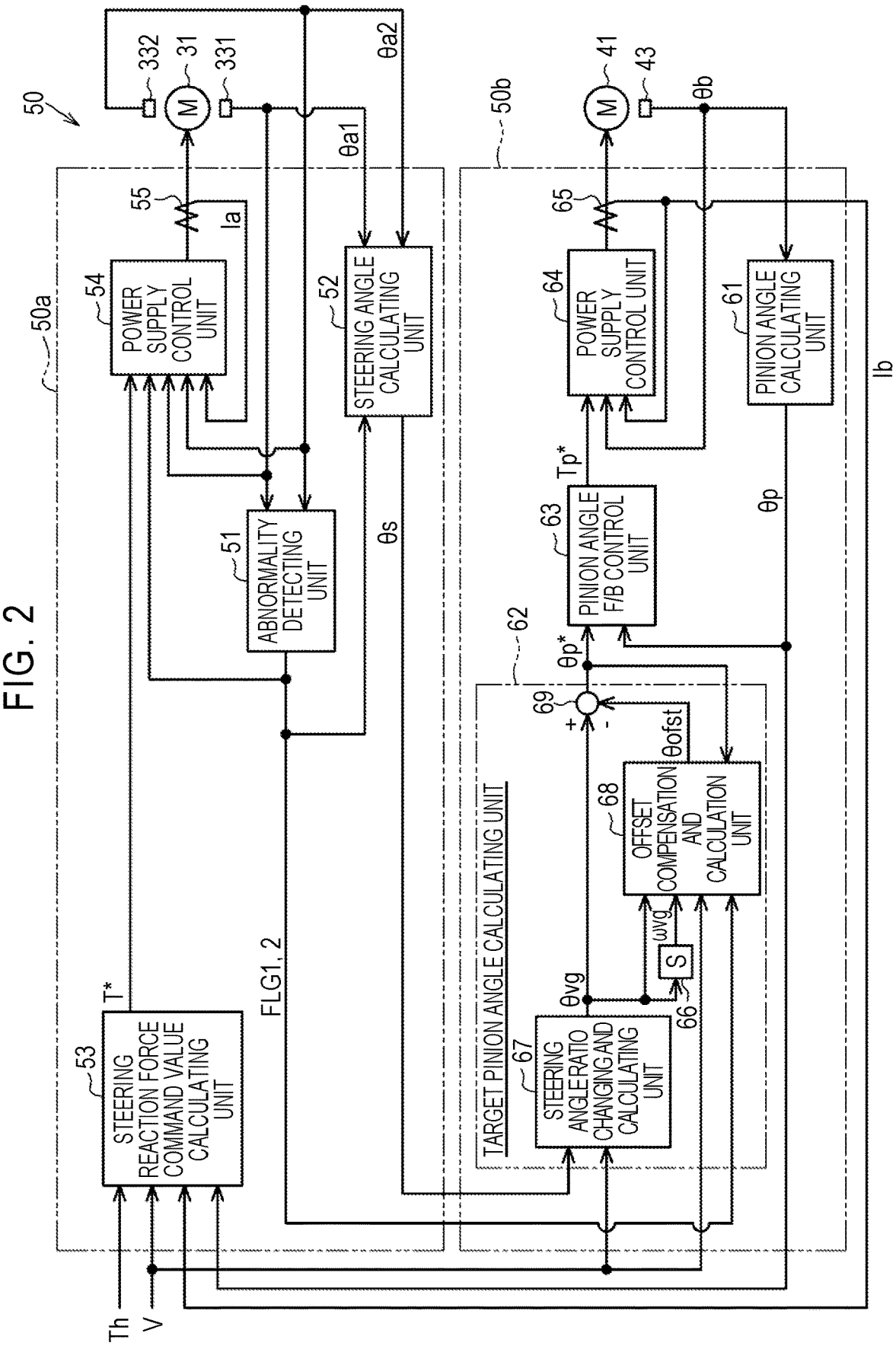
FIG. 2 is a block diagram illustrating functions of a steering control device according to the first embodiment.

Some processes which are performed by the steering control device 50 are illustrated in FIG. 2. The processes illustrated in FIG. 2 are some processes which are realized by causing the CPU to execute a program stored in the memory, for each kind of the processes which are realized.

The steering control device 50 includes a steering-side control unit 50a that controls supply of electric power to the reaction motor 31. The steering-side control unit 50a includes a steering-side current sensor 55. The steering-side current sensor 55 detects a steering-side actual current value Ia which is acquired from phase current values of the reaction motor 31 flowing in connection lines between the steering-side control unit 50a and phase motor coils of the reaction motor 31. The steering-side current sensor 55 acquires, as a current, a voltage drop of a shunt resistor connected to sources of switching elements in an inverter (not illustrated) which is provided to correspond to the reaction motor 31. In FIG. 2, for the purpose of convenience of description, the phase connection lines and the phase current sensors are collectively illustrated as being single.

The steering control device 50 includes a turning-side control unit 50b that controls supply of electric power to the turning motor 41. The turning-side control unit 50b includes a turning-side current sensor 65. The turning-side current sensor 65 detects a turning-side actual current value Ib which is acquired from phase current values of the turning motor 41 flowing in connection lines between the turning-side control unit 50b and phase motor coils of the turning motor 41. The turning-side current sensor 65 acquires, as a current, a voltage drop of a shunt resistor connected to sources of switching elements in an inverter (not illustrated) which is provided to correspond to the turning motor 41. In FIG. 2, for the purpose of convenience of description, the phase connection lines and the phase current sensors are collectively illustrated as being single.

The function of the steering-side control unit 50a will be described below. The steering torque Th, the vehicle speed V, the rotation angles θa1 and θa2, the turning-side actual current value Ib which will be described later, and a pinion angle θp which will be described later are input to the steering-side control unit 50a. The steering-side control unit 50a controls supply of electric power to the reaction motor 31 based on the steering torque Th, the vehicle speed V, the rotation angles θa1 and θa2, the turning-side actual current value Ib which will be described later, and a pinion angle θp which will be described later. The pinion angle θp is calculated based on the turning-side rotation angle θb.

The steering-side control unit 50*a* includes an abnormality detecting unit 51, a steering angle calculating unit 52, a steering reaction force command value calculating unit 53, and a power supply control unit 54. The rotation angles θa1 and θa2 are input to the abnormality detecting unit 51. The abnormality detecting unit 51 detects abnormalities of the rotation angle sensors 331 and 332 based on the rotation angles θa1 and θa2. The abnormality detecting unit 51 detects the abnormalities of the rotation angle sensors 331 and 332 based on a result of comparison with previous values of the rotation angles θa1 and θa2, and based on whether the rotation angles θa1 and θa2 are input at intervals of a predetermined cycle. For example, when the rotation angle θa1 is not input, the abnormality detecting unit 51 detects the abnormality of the first rotation angle sensor 331. In this case, when the rotation angle θa1 is input, the abnormality detecting unit 51 detects that the first rotation angle sensor 331 has returned to normality. When normality of the first rotation angle sensor 331 is detected and normality of the second rotation angle sensor 332 is detected, the abnormality detecting unit 51 generates a state flag FLG1 indicating that the sensor is normal. On the other hand, when an abnormality of the first rotation angle sensor 331 is detected and normality of the second rotation angle sensor 332 is detected, the abnormality detecting unit 51 generates a state flag FLG2 indicating that the sensor is abnormal. These state flags FLG1 and FLG2 are output to the steering angle calculating unit 52, the power supply control unit 54, and the turning-side control unit 50*b*.

The state flag FLG and the rotation angles θa1 and θa2 are input to the steering angle calculating unit 52. The steering angle calculating unit 52 converts the rotation angles θa1 and θa2 to total angles including a range exceeding 360°, for example, by counting the number of rotations of the reaction motor 31 from a neutral steering position which is a position of the steering wheel 11 when the vehicle travels straight ahead. The steering angle calculating unit 52 calculates the steering angle θs by multiplying the total angle which is acquired through conversion by a conversion factor based on a rotation speed ratio of the reduction gear mechanism 32. For example, the steering angle θs is set to be positive when it is an angle on the right side with respect to the neutral steering position and is set to be negative when it is an angle on the left side with respect to the neutral steering position. When the state flag FLG1 is input, the steering angle calculating unit 52 calculates the steering angle θs using the first rotation angle sensor 331. On the other hand, when the state flag FLG2 is input, the steering angle calculating unit 52 calculates the steering angle θs using the second rotation angle sensor 332. The calculated steering angle θs is output to the turning-side control unit 50*b*.

A steering torque Th, the vehicle speed V, the turning-side actual current value Ib, and the pinion angle θp are input to the steering reaction force command value calculating unit 53. The steering reaction force command value calculating unit 53 calculates a steering reaction force command value T* which is a target control value serving as a target of a steering reaction force based on the steering torque Th, the vehicle speed V, the turning-side actual current value Ib, and the pinion angle θp. The calculated steering reaction force command value T* is output to the power supply control unit 54.

The state flag FLG, the steering reaction force command value T*, the rotation angles θa1 and θa2, and the steering-side actual current value Ia are input to the power supply control unit 54. The power supply control unit 54 calculates a current command value for the reaction motor 31 based on the steering reaction force command value T*. The power supply control unit 54 calculates a difference between the current command value and a current value on a d-q coordinate system acquired by converting the steering-side actual current value Ia detected by the steering-side current sensor 55 based on the rotation angles θa1 and θa2, and controls supply of electric power to the reaction motor 31 such that the difference is cancelled out. In this case, when the state flag FLG1 is input, the power supply control unit 54 uses the current value on the d-q coordinate system acquired by converting the steering-side actual current value Ia detected by the steering-side current sensor 55 based on the rotation angle θa1. On the other hand, when the state flag FLG2 is input, the power supply control unit 54 uses the current value on the d-q coordinate system acquired by converting the steering-side actual current value Ia detected by the steering-side current sensor 55 based on the rotation angle θa2. Accordingly, the reaction motor 31 generates a torque based on the steering reaction force command value T*. It is possible to give an appropriate feeling of response based on a road reaction force to a driver.

The function of the turning-side control unit 50*b* will be described below. The vehicle speed V, the state flag FLG, the rotation angle θb, and the steering angle θs are input to the turning-side control unit 50*b*. The turning-side control unit 50*b* controls supply of electric power to the turning motor 41 based on the vehicle speed V, the state flag FLG, the rotation angle θb, and the steering angle θs.

The turning-side control unit 50*b* includes a pinion angle calculating unit 61, a target pinion angle calculating unit 62, a pinion angle feedback control unit ("pinion angle F/B control unit" in the drawing) 63, and a power supply control unit 64.

The rotation angle θb is input to the pinion angle calculating unit 61. The pinion angle calculating unit 61 converts the rotation angle θb to a total angle including a range exceeding 360°, for example, by counting the number of rotations of the turning motor 41 from a neutral rack position which is a position of the turning shaft 14 when the vehicle travels straight ahead. The pinion angle calculating unit 61 calculates the pinion angle θp which is an actual rotation angle of the pinion shaft 44 by multiplying the total angle which is acquired through conversion by a conversion factor based on a rotation speed ratio of the reduction gear mechanism 42. For example, the pinion angle θp is set to be positive when it is an angle on the right side with respect to the neutral rack position and is set to be negative when it is an angle on the left side with respect to the neutral rack position. The turning motor 41 and the pinion shaft 44 operate in conjunction with each other via the reduction gear mechanism 42. Accordingly, the rotation angle θb of the turning motor 41 and the pinion angle θp have a correlation therebetween. The pinion angle θp can be calculated from the rotation angle θb of the turning motor 41 using the correlation. The pinion shaft 44 engages with the turning shaft 14. Accordingly, the pinion angle θp and an amount of movement of the turning shaft 14 have a correlation therebetween. That is, the pinion angle θp is a value in which a turning angle θw of the turning wheels 16 is reflected. The calculated pinion angle θp is output to the pinion angle F/B control unit 63 and the steering reaction force command value calculating unit 53.

The vehicle speed V, the state flag FLG, and the steering angle θs are input to the target pinion angle calculating unit 62. The target pinion angle calculating unit 62 calculates a target pinion angle $\theta p^*$ which is a target control value serving as a target of the pinion angle $\theta p$, based on the vehicle speed V, the state flag FLG, and the steering angle $\theta s$.

Specifically, the target pinion angle calculating unit 62 includes a steering angle ratio changing and calculating unit 67 and an offset compensation and calculation unit 68. The vehicle speed V and the steering angle $\theta s$ are input to the steering angle ratio changing and calculating unit 67. The steering angle ratio changing and calculating unit 67 calculates a converted angle $\theta vg$ by adding an adjustment value $\Delta \theta a$ to the steering angle $\theta s$. The steering angle ratio changing and calculating unit 67 changes the adjustment value $\Delta \theta a$ for changing a steering angle ratio which is a ratio of the converted angle $\theta vg$ to the steering angle$\theta$, according to the vehicle speed V. For example, the adjustment value $\Delta \theta a$ is changed such that change of the converted angle $\theta vg$ with respect to change of the steering angle $\theta s$ is greater when the vehicle speed V is low than when the vehicle speed V is high. The acquired converted angle $\theta vg$ is output to the offset compensation and calculation unit 68 and a subtractor 69 and a converted angular velocity $\omega vg$ acquired from a differentiator 66 by differentiating the converted angle $\theta vg$ is output to the offset compensation and calculation unit 68. The converted angle $\theta vg$ is an angle serving as a base of the target pinion angle $\theta p^*$. The pinion angle $\theta p$ is controlled based on the target pinion angle $\theta p^*$. Accordingly, the converted angle $\theta vg$ and the pinion angle $\theta p$ have a correlation therebetween. That is, the converted angular velocity $\omega vg$ acquired based on the converted angle $\theta vg$ is a value in which the turning angle $\theta w$ of the turning wheels 16 is reflected as a turning state of the turning mechanism TK.

The vehicle speed V, the state flag FLG, the converted angle $\theta vg$, the converted angular velocity $\omega vg$, and the target pinion angle $\theta p^*$ are input to the offset compensation and calculation unit 68. The offset compensation and calculation unit 68 calculates an offset value $\theta ofst$ which is a compensation value at the time of calculating the target pinion angle $\theta p^*$ based on the vehicle speed V, the state flag FLG, the converted angle $\theta vg$, the converted angular velocity $\omega vg$, and the target pinion angle $\theta p^*$. The offset value $\theta ofst$ will be described later in detail. The value obtained by subtracting the acquired offset value $\theta ofst$ from the converted angle $\theta vg$ is output to the pinion angle F/B control unit 63 as a target pinion angle $\theta p^*$ acquired from the subtractor 69.

The target pinion angle $\theta p^*$ and the pinion angle $\theta p$ are input to the pinion angle F/B control unit 63. The pinion angle F/B control unit 63 calculates a turning force command value $Tp^*$ which is a target control value serving as a target of a turning force in feedback control of the pinion angle $\theta p$ such that the pinion angle $\theta p$ conforms to the target pinion angle $\theta p^*$. The acquired turning force command value $Tp^*$ is output to the power supply control unit 64.

The turning force command value $Tp^*$, the rotation angle $\theta b$, and the turning-side actual current value Ib are input to the power supply control unit 64. The power supply control unit 64 calculates a current command value for the turning motor 41 based on the turning force command value $Tp^*$. Then, the power supply control unit 54 calculates a difference between the current command value and a current value on the d-q coordinate system acquired by converting the turning-side actual current value Ib detected by the turning-side current sensor 65 based on the rotation angle $\theta b$, and controls supply of electric power to the turning motor 41 such that the difference is cancelled out. Accordingly, the turning motor 41 rotates by an angle corresponding to the turning force command value $Tp^*$.

The steering control device 50 includes a plurality of control states including a first control state and a second control state. In the first control state, a target pinion angle $\theta p^*(1)$ which is calculated based on a converted angle $\theta vg(1)$ corresponding to a steering angle $\theta s(1)$ acquired from the rotation angle $\theta a1$ detected by the first rotation angle sensor 331 is controlled. In the second control state, a target pinion angle $\theta p^*(2)$ which is calculated based on a converted angle $\theta vg(2)$ corresponding to a steering angle $\theta s(2)$ acquired from the rotation angle $\theta a2$ detected by the second rotation angle sensor 332 is controlled. The steering control device 50 switches between the first control state and the second control state based on a result of detection regarding an abnormality in the rotation angle sensors 331 and 332 from the abnormality detecting unit 51.

Specifically, the steering control device 50 basically switches to the first control state based on the state flag FLG1, and switches to the second control state when it is determined that the first control state cannot be maintained. The determination indicating that the first control state cannot be maintained is connected with detection of an abnormality in the first rotation angle sensor 331, that is, the state flag FLG2. Accordingly, the second control state functions as a control state for backing up the first control state. The steering control device 50 switches to the second control state in backup based on the state flag FLG2, and switches to the first control state when it is determined that return to the first control state is possible. The determination indicating that return to the first control state is connected with detection of return to normality in the first rotation angle sensor 331, that is, the state flag FLG1.

When there is a difference between the steering angle $\theta s(1)$ and the steering angle $\theta s(2)$, the difference appears as a difference between the target pinion angle $\theta p^*(1)$ and the target pinion angle $\theta p^*(2)$. That is, there is a likelihood that there will be a difference in the target pinion angle $\theta p^*$ between before and after the control state is switched. For the purpose of coping with this case, the steering control device 50, that is, the turning-side control unit 50b, has a function of the offset compensation and calculation unit 68.

Figure 3:
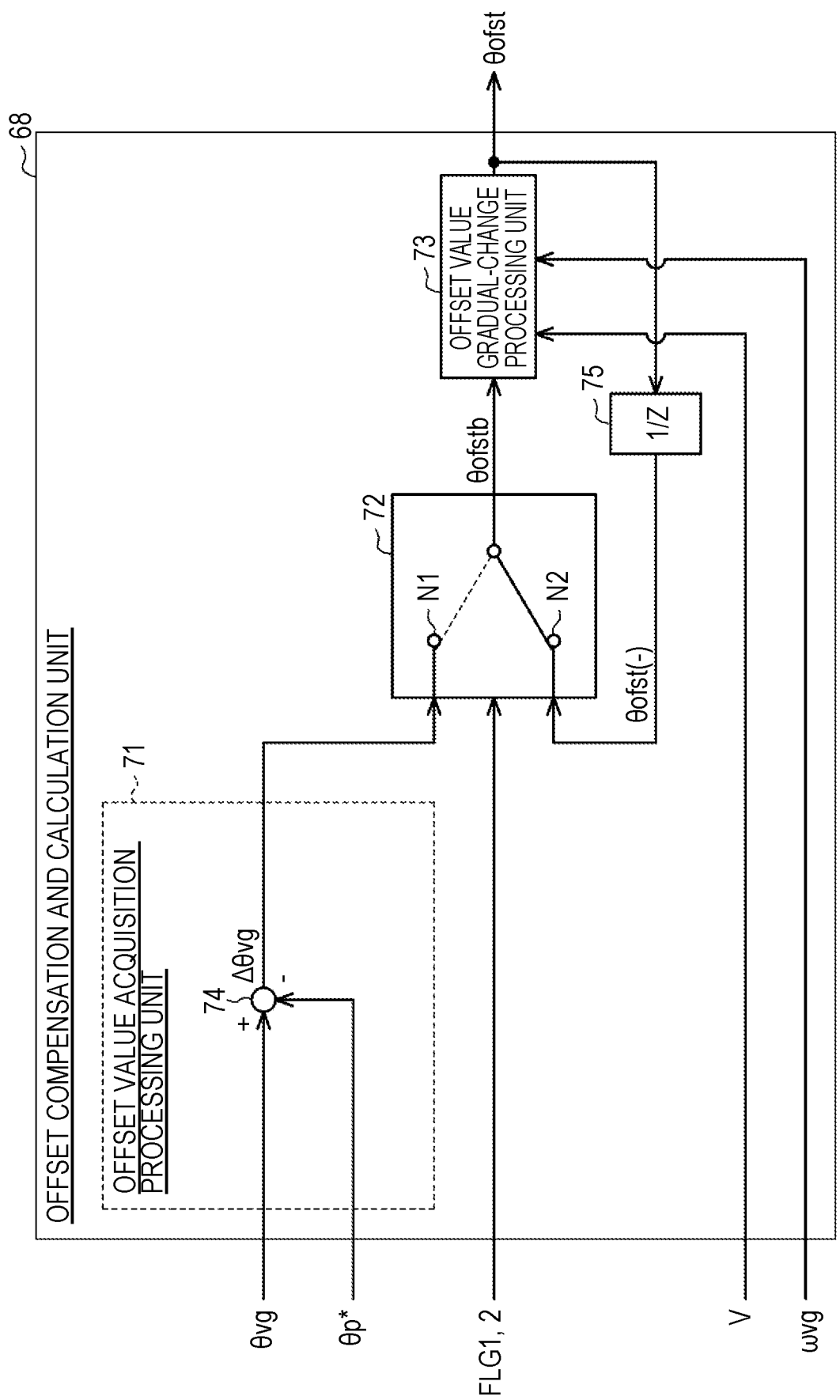
FIG. 3 is a block diagram illustrating functions of an offset compensation and calculation unit according to the first embodiment.

The function of the offset compensation and calculation unit 68 will be described below in more detail. As illustrated in FIG. 3, the offset compensation and calculation unit 68 includes an offset value acquisition processing unit 71, a calculated value switching unit 72, and an offset value gradual-change processing unit 73.

The converted angle $\theta vg$ and the target pinion angle $\theta p^*$ are input to the offset value acquisition processing unit 71. The offset value acquisition processing unit 71 calculates a difference $\Delta \theta vg$ which is acquired from a subtractor 74 by subtracting the target pinion angle $\theta p^*$ from the converted angle $\theta vg$. The target pinion angle $\theta p^*$ input to the offset value acquisition processing unit 71 is a previous target pinion angle $\theta p^*$ which was used at the time of control of the turning motor 41 in a previous cycle (one cycle before). The previous target pinion angle $\theta p^*$ is a value which is calculated based on a previous converted angle $\theta vg$ in the previous cycle (one cycle before) and is a value in which the previous converted angle $\theta vg$ is reflected. That is, the difference $\Delta \theta vg$ can also be said to be a difference of the converted angle $\theta vg$ which is acquired by subtracting the previous converted angle $\theta vg$ from the current converted angle $\theta vg$. The acquired difference $\Delta \theta vg$ is output to the calculated value switching unit 72.

The state flag FLG, the difference $\Delta \theta vg$, and a previous offset value $\theta ofst(-)$ which is a value maintained in the previous cycle (one cycle before) in a previous value maintaining unit 75 are input to the calculated value switching unit 72. The difference $\Delta\theta vg$ is input to a first input N1 of the calculated value switching unit 72 and the offset value $\theta ofst(-)$ is input to a second input N2 of the calculated value switching unit 72.

When a state flag FLG which is different from the previous state flag FLG which is a value in the previous cycle (one cycle before) is input, the calculated value switching unit 72 controls a selection state such that the difference $\Delta\theta vg$ input to the first input N1 is output as an offset base value $\theta ofstb$ which is a base value of the offset value $\theta ofst$. The selection state in which the difference $\Delta\theta vg$ is output as the offset base value $\theta ofstb$ instantaneously occurs at the time of switching from the state flag FLG1 to the state flag FLG2. The time of switching from the state flag FLG1 to the state flag FLG2 is a time of switching from the first control state to the second control state. The same applies to a time of switching from the second control state to the first control state which is a time of switching from the state flag FLG2 to the state flag FLG1.

On the other hand, when the same state flag FLG as the previous state flag FLG which is a value in the previous cycle (one cycle before) is input, the calculated value switching unit 72 controls the selection state such that the offset value $\theta ofst(-)$ input to the second input N2 is output as the offset base value $\theta ofstb$. The selection state in which the offset value $\theta ofst(-)$ is output as the offset base value $\theta ofstb$ is continuously maintained in a period of time in which the input of the state flag FLG1 is maintained or in a period of time in which the input of the state flag FLG2 is maintained. The period of time in which the input of the state flag FLG1 is maintained is a period of time in which the first control state is maintained. The period of time in which the input of the state flag FLG2 is maintained is a period of time in which the second control state is maintained.

As the offset base value $\theta ofstb$ which is selected as an appropriate value in this way, the difference $\Delta\theta vg$ calculated by the offset value acquisition processing unit 71 is output to the offset value gradual-change processing unit 73 at the time of switching from the state flag FLG1 to the state flag FLG2. As the offset base value $\theta ofstb$, the offset value $\theta ofst(-)$ which is a previous value of the offset value gradual-change processing unit 73 is output to the offset value gradual-change processing unit 73 at the time of maintaining of the state flag FLG.

The difference $\Delta\theta vg$ has a non-zero value when there is a difference between the steering angle $\theta s(1)$ and the steering angle $\theta s(2)$ at the time of switching of the control state. On the other hand, the calculated value switching unit 72 operates such that the difference $\Delta\theta vg$ which can be generated due to switching of the control state is reflected in the offset base value $\theta ofstb$ by outputting the difference $\Delta\theta vg$ input to the first input N1 at the time of switching of the control state.

On the other hand, even at a time other than the time of switching of the control state, the difference $\Delta\theta vg$ has a non-zero value when there is a difference between the steering angle $\theta s(1)$ and the steering angle $\theta s(2)$. On the other hand, since the difference $\Delta\theta vg$ input to the first input N1 is output only at the time of switching of the control state, the calculated value switching unit 72 operates such that the difference $\Delta\theta vg$ which can be generated at a time other than the time of switching of the control state is not reflected in the offset base value $\theta ofstb$.

Figure 4:
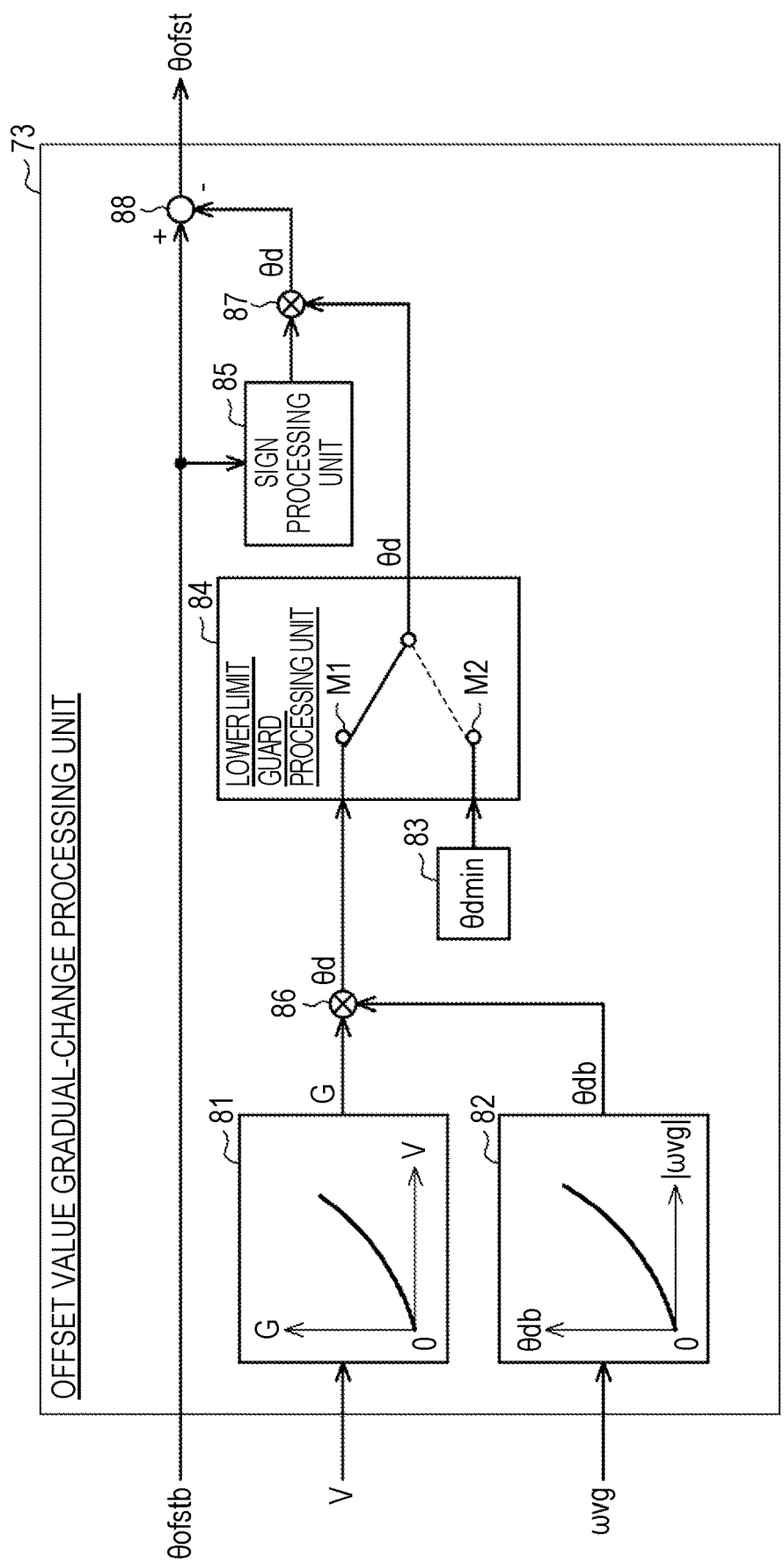
FIG. 4 is a block diagram illustrating functions of an offset value gradual-change processing unit according to the first embodiment.

The vehicle speed V, the converted angular velocity $\omega vg$, and the offset base value $\theta ofstb$ are input to the offset value gradual-change processing unit 73. Specifically, as illustrated in FIG. 4, the offset value gradual-change processing unit 73 includes a decrease gain map calculating unit 81, a decrease value map calculating unit 82, a storage unit 83, a lower limit guard processing unit 84, and a sign processing unit 85.

The vehicle speed V is input to the decrease gain map calculating unit 81. The decrease gain map calculating unit 81 includes a map in which a relationship between the vehicle speed V and a decrease gain G is defined and calculates the decrease gain G using the map and using the vehicle speed V as an input. The decrease gain G is a gain serving to gradually decrease the offset value $\theta ofst$ such that the target pinion angle $\theta p^*$ does not change suddenly with the decrease of the offset value $\theta ofst$. In this case, the decrease gain G is calculated such that the absolute value thereof increases as the vehicle speed V increases in consideration of a traveling state of the vehicle. The calculated decrease gain G is output to a multiplier 86.

The converted angular velocity $\omega vg$ is input to the decrease value map calculating unit 82. The decrease value map calculating unit 82 includes a map in which a relationship between the converted angular velocity $\omega vg$ and a decrease base value $\theta db$ which is a base value of a decrease value $\theta d$ is defined, and calculate the decrease base value $\theta db$ using the map and using the converted angular velocity $\omega vg$ as an input. The decrease base value $\theta db$ is a component that serves to gradually decrease the offset value $\theta ofst$ such that the target pinion angle $\theta p^*$ does not change suddenly with the decrease of the offset value $\theta ofst$. In this case, the decrease base value $\theta db$ is calculated such that the absolute value thereof increases as the converted angular velocity $\omega vg$, that is, the rate of change of the turning angle $\theta w$ of the turning wheels 16, increases in consideration of the turning state of the turning mechanism TK. The value obtained by multiplying the calculated decrease base value $\theta db$ by the decrease gain G is output to the lower limit guard processing unit 84 as a decrease value $\theta d$ acquired from the multiplier 86.

The storage unit 83 is a predetermined storage area of a memory (not illustrated) in which a minimum value $\theta dmin$ of the decrease value $\theta d$ is stored. The minimum value $\theta dmin$ is a component that serves to decrease the offset value $\theta ofst$ such that the offset value $\theta ofst$ is not constantly left. The minimum value $\theta dmin$ is set to a value in a range which is experimentally acquired as an index for securing a minimum of the decrease value $\theta d$ even when the decrease value $\theta d$ output from the multiplier 86 is less than the minimum value $\theta dmin$. The acquired minimum value $\theta dmin$ is output to the lower limit guard processing unit 84.

The decrease value $\theta d$ output from the multiplier 86 and the minimum value $\theta dmin$ output from the storage unit 83 are input to the lower limit guard processing unit 84. The decrease value $\theta d$ is input to a first input M1 of the lower limit guard processing unit 84 and the minimum value $\theta dmin$ is input to a second input M2 of the lower limit guard processing unit 84. The lower limit guard processing unit 84 is configured to switch its selection state such that one of the decrease value $\theta d$ and the minimum value $\theta dmin$ is output as the decrease value $\theta d$.

Specifically, the lower limit guard processing unit 84 determines whether the decrease value $\theta d$ input to the first input M1 is equal to or greater than the minimum value $\theta dmin$. When the decrease value $\theta d$ input to the first input M1 is equal to or greater than the minimum value $\theta dmin$, the lower limit guard processing unit 84 controls the selection state of the lower limit guard processing unit 84 such that the decrease value $\theta d$ input to the first input M1 is output as the final decrease value θd. On the other hand, when the decrease value θd input to the first input M1 is less than the minimum value θdmin, the lower limit guard processing unit 84 controls the selection state of the lower limit guard processing unit 84 such that the minimum value θdmin is output as the final decrease value θd. That is, the lower limit guard processing unit 84 operates to decrease the offset value θofst by at least the minimum value θdmin such that the offset value θofst is not constantly left. The decrease value θd which is selected as an appropriate value in this way is output to a multiplier 87.

The offset base value θofstb is input to the sign processing unit 85. The sign processing unit 85 determines a sign of the offset base value θofstb and calculates one of "1" and "−1" as a value corresponding to the sign. The sign processing unit 85 calculates "1" when the offset base value θofstb is positive, and calculates "−1" when the offset base value θofstb is negative. The value obtained by multiplying the decrease value θd by the calculated value of "1" or "−1" is output to a subtractor 88 as the final decrease value θd acquired from the multiplier 87. Then, the value obtained by subtracting the final decrease value θd from the offset base value θofstb is output to the subtractor 69 as the offset value θofst acquired from the subtractor 88.

When the offset value θofst is a non-zero value, the offset value gradual-change processing unit 73 operates such that the decrease value θd output from the lower limit guard processing unit 84 is reflected in the offset value θofst. On the other hand, when the offset value θofst is zero, the offset value gradual-change processing unit 73 operates such that the decrease value θd output from the lower limit guard processing unit 84 is not reflected in the offset value θofst. The offset value gradual-change processing unit 73 operates such that the sign of the offset base value θofstb is not inverted as the result of reflection of the decrease value θd. That is, when the absolute value of the offset base value θofstb is less than the absolute value of the decrease value θd, the offset value gradual-change processing unit 73 operates such that the absolute value of the decrease value θd is the same as the absolute value of the offset base value θofstb.

Operations of this embodiment will be described below. Portions (a) to (c) in FIG. 5 illustrate various change modes in an example in which the state flag FLG is switched to the state flag FLG2 indicating an abnormality of a sensor at the timing of time t1, from the state flag FLG1 indicating normality of the sensor. The following description is based on the premise that the offset value θofst at time "0" is zero, the steering angle θs(1) corresponding to the rotation angle θa1 and the steering angle θs(2) corresponding to the rotation angle θa2 change constantly with a predetermined angle difference a, and the vehicle speed V is constant.

As illustrated in the portion (a) in FIG. 5, a converted angle θvg(1) indicated by an alternate long and short dash line in the lower part of the graph and a converted angle θvg(2) indicated by an alternate long and two short dashes line in the upper part of the graph change with an angle difference a. This can be understood as change of a target pinion angle θp*(1) which is calculated based on the converted angle θvg(1) and change of a target pinion angle θp*(2) which is calculated based on the converted angle θvg(2). At the timing of time t1, the offset value acquisition processing unit 71 operates to calculate the angle difference a as a difference Δθvg.

In this case, as illustrated in the portion (b) in FIG. 5, the calculated value switching unit 72 operates to calculate the offset base value θofstb indicating the angle difference a, which is calculated as the offset value θofst. After time t1, the offset value gradual-change processing unit 73 operates to gradually decrease the offset value θofst. The offset value θofst decreases gradually up to time t2 at which it is zero. The offset value θofst which changes in this way is reflected to perform compensation for the target pinion angle θp* by being subtracted from the converted angle θvg at that time through the function of the offset compensation and calculation unit 68.

As a result, when the control state is switched as indicated by a solid line in the portion (a) in FIG. 5, the target pinion angle θp* which is a post-switching target control value after time t1 is shifted to the target pinion angle θp*(1) which is a pre-switching target control value before time t1 through compensation using the offset value θofst. Particularly, at the instantaneous time of switching, the compensation is performed such that the target pinion angle θp* almost (substantially) matches the target pinion angle θp*(1).

Thereafter, as indicated by a solid line in the drawing, the target pinion angle θp* approaches the original target pinion angle θp*(2) as the offset value θofst decreases gradually. The target pinion angle θp* changes to reach the original target pinion angle θp*(2) at the timing of time t2 at which the offset value θofst is zero.

Advantages of this embodiment will be described below. In this embodiment, as indicated by the solid line in the portion (a) in FIG. 5, even when there is difference between the target pinion angle θp*(1) and the target pinion angle θp*(2) before and after switching of the control state, such a difference can be prevented from appearing as the change of the target pinion angle θp* which is used for actual control. That is, it is possible to curb occurrence of movement of the turning mechanism TK which is not intended by a driver. As a result, it is possible to curb a driver's discomfort.

According to this embodiment, when an abnormality occurs in the first rotation angle sensor 331, the control state can be switched to the second control state for backup for calculating the target pinion angle θp* using the result of detection from the redundant second rotation angle sensor 332. This is for avoiding calculation of the target pinion angle θp* based on the result of detection from the first rotation angle sensor 331. In this case, even when there is difference between the steering angle θs(1) and the steering angle θs(2) before and after switching of the control state, it is possible to prevent the target pinion angle θp* after the control state is switched from causing a difference from the pre-switching target pinion angle θp*. Accordingly, even when the control state is switched to a control state for backup due to an abnormality occurring in the first rotation angle sensor 331, it is possible to curb occurrence of movement of the turning mechanism TK which is not intended by a driver.

Here, since the offset value θofst is for forcibly shifting the original target pinion angle θp*(2) after the switching, the offset value θofst needs to be cancelled out as soon as possible, but movement of the turning mechanism TK which is not intended by a driver appears eventually when a decrease value of the offset value is set to be excessively large.

Therefore, the offset value gradual-change processing unit 73 has the functions of the decrease gain map calculating unit 81 that considers the traveling state of the vehicle and the decrease value map calculating unit 82 that considers the turning state of the turning mechanism TK. Accordingly, the decrease value θd for decreasing the offset value θofst is increased as the vehicle speed V increases and as the change amount of the turning angle θw of the turning wheels 16 increases. As a result, it is possible to curb a driver's discomfort and to cancel out the offset value θofst as soon as possible.

The offset value gradual-change processing unit 73 has the function of the lower limit guard processing unit 84 that considers the minimum value θdmin. Accordingly, it is possible to prevent the offset value θofst from being constantly left and to effectively decrease the offset value θofst.

This embodiment may be modified as follows. The following modified examples can be combined with each other unless technical conflicts arise. When there is no problem in a situation in which the offset value θofst does not decrease, the offset value gradual-change processing unit 73 may not have the function of the lower limit guard processing unit 84. In addition, the offset value gradual-change processing unit 73 may have a function of basically decreasing the offset value θofst by the minimum value θdmin. In this case, the decrease gain map calculating unit 81 and the decrease value map calculating unit 82 can be omitted. The offset value gradual-change processing unit 73 may decrease the offset value θofst by multiplying the offset base value θofstb by a gain. The gain in this case may be considered to be the same in the decrease gain map calculating unit 81 and the decrease value map calculating unit 82.

The offset value gradual-change processing unit 73 may further include an calculation unit that considers another state in addition to the decrease gain map calculating unit 81 and the decrease value map calculating unit 82. The offset value gradual-change processing unit 73 may include only one of the decrease gain map calculating unit 81 and the decrease value map calculating unit 82 or may include a calculation unit that considers another state instead of both of them. As the other state, for example, a current value, that is, a residual value, of the offset value θofst, can be considered. In this case, a rate of change of the decrease can be caused to be smaller as the residual value becomes smaller.

In the decrease gain map calculating unit 81, the change mode of the decrease gain G can be changed appropriately. For example, the vehicle speed V may be classified into a low speed, a middle speed, a high speed, and the like and the decrease gain G may be kept constant at the low speed. In this way, the change mode of the decrease gain G may be changed according to the classifications.

In the decrease value map calculating unit 82, the change mode of the decrease base value θdb can be changed appropriately. For example, the converted angular velocity ωvg may be classified into a low angular velocity, a middle angular velocity, a high angular velocity, and the like and the decrease base value θdb may be kept constant at the low angular velocity. In this way, the change mode of the decrease base value θdb may be changed according to the classifications.

In the decrease value map calculating unit 82, a pinion angular velocity which is acquired by differentiating the pinion angle θp may be used instead of the converted angular velocity ωvg. In addition, the decrease value map calculating unit 82 may calculate the decrease base value θdb corresponding to the angle at that time using the steering angle θs or the pinion angle θp.

The control state for backup may be a control state for coping with an abnormality of a torque sensor by making the torque sensor 34 redundant, a control state for coping with an abnormality of a power supply structure by making the power supply structure of the steering system 10 redundant, or a control state for coping with an abnormality of the turning-side control unit by making the turning-side control unit 50b redundant. When the turning-side control unit 50b is made redundant, the turning-side control unit 50b includes, for example, a first turning-side control unit and a second turning-side control unit. In this case, wirings of the turning motor 41 are made redundant and the first turning-side control unit and the second turning-side control unit control driving of the turning motor 41 in cooperation with each other. The first turning-side control unit receives a component based on the result of detection from the first rotation angle sensor 331 as an input, the second turning-side control unit receives a component based on the result of detection from the second rotation angle sensor 332 as an input, and the respective turning-side control units independently calculate the target pinion angle θp*. The first turning-side control unit and the second turning-side control unit employ, for example, a master-slave control system. In this case, in the first control state in which the first rotation angle sensor 331 is normal, the first turning-side control unit is set as a master control unit and the turning-side control units control driving of the turning motor 41 in cooperation with each other using the target pinion angle θp* which is calculated by the first turning-side control unit. On the other hand, in the second control state in which the first rotation angle sensor 331 is abnormal, the function of the first turning-side control unit is stopped and driving of the turning motor 41 is controlled through only second turning-side control using the target pinion angle θp* which is calculated by the second turning-side control unit. In this case, there is a likelihood that the target pinion angle θp* will be shifted before and after switching of the control state similarly to the aforementioned embodiment. Similarly to the aforementioned embodiment, this can also be solved by employing the offset compensation and calculation unit 68 according to the aforementioned embodiment.

The control state for backup may be a control state for coping with an abnormality in the function of changing the steering angle ratio of the steering angle ratio changing and calculating unit 67. In this case, the steering angle ratio changing and calculating unit 67 may switch a first control state in which the steering angle ratio is variable when the vehicle speed sensor 501, that is, the vehicle speed V, is normal to a second control state in which the steering angle ratio is fixed when the vehicle speed sensor 501, that is, the vehicle speed V, is abnormal. In this case, there is a likelihood that the target pinion angle θp* will be shifted before and after switching of the control state similarly to the aforementioned embodiment. Similarly to the aforementioned embodiment, this can also be solved by employing the offset compensation and calculation unit 68 according to the aforementioned embodiment.

The sensors that detect rotation angles which are state variables used for calculating the target pinion angle θp* for each control state may detect independent rotation angles of different detection targets. For example, the steering system 10 may include a steering angle sensor that directly detects the steering angle θs of the steering shaft 12. In this case, the first rotation angle sensor 331 and the steering angle sensor are connected to the steering-side control unit 50a. The turning-side control unit 50b may switch the first control state in which the target pinion angle θp* is calculated using the rotation angle θa detected by the first rotation angle sensor 331 to the second control state in which the target pinion angle θp* is calculated using the rotation angle detected by the steering angle sensor when the first rotation angle sensor 331 is abnormal. In this case, there is a likelihood that the target pinion angle θp* will be shifted before and after switching the control state similarly to the aforementioned embodiment. Similarly to the aforementioned embodiment, this can also be solved by employing the offset compensation and calculation unit 68 according to the aforementioned embodiment.

The offset base value θofstb may not be acquired from the difference Δθvg, but may be acquired from a difference regarding the rotation angle θa1 and the rotation angle θa2 between before and after switching of the control state, or may be acquired from a difference regarding the target pinion angle θp* between before and after switching of the control state. The offset base value θofstb may be acquired from a difference regarding the converted angle θvg between before and after switching of the control state.

The offset compensation and calculation unit 68 according to the aforementioned embodiment may be added as a function of the steering-side control unit 50a. This is effective when the steering reaction force command value T* is calculated based on the rotation angles θa1 and θa2, that is, the steering angle θs. This modified example is effective when the control state for backup is a control state for coping with an abnormality of the torque sensor by making the torque sensor 34 redundant.

The sign processing unit 85 may calculate and output "0 (zero)" when the offset base value θofstb is zero. In this case, when the offset base value θofstb is zero, the decrease value θd is zero. That is, in this modified example, the offset value gradual-change processing unit 73 can operate such that the decrease value θd output from the lower limit guard processing unit 84 is not reflected in the offset value θofst when the offset value θofst is zero.

The steering angle ratio changing and calculating unit 67 may change the steering angle ratio, for example, according to a yaw rate which is detected by a yaw rate sensor of the vehicle in addition to the vehicle speed V. In this case, the steering angle ratio changing and calculating unit 67 may switch the control state in which the steering angle ratio is variable when the yaw rate sensor, that is, the yaw rate, is normal, to the second control state in which the steering angle ratio is fixed or is variable based on only the vehicle speed V when the yaw rate sensor, that is, the yaw rate, is abnormal. In this case, there is a likelihood that the target pinion angle θp* will be shifted before and after switching of the control state similarly to the aforementioned embodiment. Similarly to the aforementioned embodiment, this can also be solved by employing the offset compensation and calculation unit 68 according to the aforementioned embodiment. This modified example can also be applied to a case in which the steering angle ratio is variable according to a lateral acceleration output from a lateral acceleration sensor of the vehicle in addition to the vehicle speed V.

The pinion angle F/B control unit 63 may change a F/B gain, for example, according to the yaw rate detected by the yaw rate sensor of the vehicle. In this case, the pinion angle F/B control unit 63 may switch the first control state in which the F/B gain is variable when the yaw rate sensor, that is, the yaw rate, is normal to the second control state in which the F/B gain is fixed when the yaw rate sensor, that is, the yaw rate, is abnormal. In this case, there is a likelihood that the target pinion angle θp* will be shifted before and after switching of the control state similarly to the aforementioned embodiment. Similarly to the aforementioned embodiment, this can also be solved by employing the offset compensation and calculation unit 68 according to the aforementioned embodiment. This modified example can also be applied to a case in which the F/B gain is variable according to another state variable.

The steering reaction force command value calculating unit 53 needs to use at least the steering torque Th to calculate the steering reaction force command value T*, and may not use the vehicle speed V or may use a combination thereof with another element.

In the aforementioned embodiment, the steering angle ratio may be fixed. In this case, the steering angle ratio changing and calculating unit 67 can be omitted. In the aforementioned embodiment, the turning motor 41 may employ, for example, a structure in which the turning motor 41 is provided coaxial with the turning shaft 14 or a structure in which the turning motor 41 is connected to the turning shaft 14 via a belt reduction gear using a ball screw mechanism.

In the aforementioned embodiment, the CPU constituting the steering control device 50 may be realized as one or more processors that execute a computer program, one or more dedicated hardware circuits such as application-specific integrated circuits that perform at least some process of various processes, or a circuit including a combination of the processor and the dedicated hardware circuit. The memory may be constituted using all available mediums that can be accessed by a general-purpose or dedicated computer.

In the aforementioned embodiment, the steering system 10 employs a linkless structure in which the steering mechanism SK and the turning mechanism TK are normally mechanically disconnected from each other, but the disclosure is not limited thereto and a structure in which the steering mechanism SK and the turning mechanism TK can be mechanically disconnected by a clutch 21 may be employed as indicated by an alternate long and two short dashes line in FIG. 1. The steering system 10 may be an electric power steering system that applies an assist force which is a force for assisting steering of the steering wheel 11. In this case, the steering wheel 11 is mechanically connected to the pinion shaft 13 via the steering shaft 12.

Second Embodiment

A second embodiment will be described below. A steering system 10 of a vehicle according to the second embodiment is illustrated in FIG. 6. The same elements as in the first embodiment will be referred to by the same reference signs and description thereof will be omitted.

As illustrated in FIG. 6, the steering mechanism SK includes the reaction motor 31, the reduction gear mechanism 32, a rotation angle sensor 33, and the torque sensor 34 as a configuration for generating a steering reaction force. A steering control device 50 that controls driving of the motors 31 and 41 is connected to the reaction motor 31 and the turning motor 41. The steering control device 50 controls driving of the motors 31 and 41 by controlling supply of currents which are control values of the motors 31 and 41 based on results of detection from various sensors. Examples of the various sensors include a vehicle speed sensor 501, the torque sensor 34, the rotation angle sensor 33, and the rotation angle sensor 43. The vehicle speed sensor 501 detects a vehicle speed V which is a traveling speed of the vehicle.

The configuration of the steering control device 50 will be described below. The steering control device 50 includes a central processing unit (CPU) and a memory which are not illustrated and the CPU executes a program stored in the memory at intervals of a predetermined operation cycle. Accordingly, various processes are performed.

Some processes which are performed by the steering control device 50 are illustrated in FIG. 7. The processes illustrated in FIG. 7 are some processes which are realized by causing the CPU to execute a program stored in the memory for each kind of the processes which are realized.

The steering control device 50 includes a steering-side control unit 50a that controls supply of electric power to the reaction motor 31. The steering-side control unit 50a includes a steering-side current sensor 55. The steering-side current sensor 55 detects a steering-side actual current value Ia which is acquired from phase current values of the reaction motor 31 flowing in connection lines between the steering-side control unit 50a and phase motor coils of the reaction motor 31. The steering-side current sensor 55 acquires, as a current, a voltage drop of a shunt resistor connected to sources of switching elements in an inverter (not illustrated) which is provided to correspond to the reaction motor 31. In FIG. 7, for the purpose of convenience of description, the phase connection lines and the phase current sensors are collectively illustrated as being single.

The steering control device 50 includes a turning-side control unit 50b that controls supply of electric power to the turning motor 41. The turning-side control unit 50b includes a turning-side current sensor 65. The turning-side current sensor 65 detects a turning-side actual current value Ib which is acquired from phase current values of the turning motor 41 flowing in connection lines between the turning-side control unit 50b and phase motor coils of the turning motor 41. The turning-side current sensor 65 acquires, as a current, a voltage drop of a shunt resistor connected to sources of switching elements in an inverter (not illustrated) which is provided to correspond to the turning motor 41. In FIG. 7, for the purpose of convenience of description, the phase connection lines and the phase current sensors are collectively illustrated as being single.

The function of the steering-side control unit 50a will be described below. The steering torque Th, the vehicle speed V, the rotation angle $\theta a$, the turning-side actual current value Ib which will be described later, and a pinion angle $\theta p$ which will be described later are input to the steering-side control unit 50a. The steering-side control unit 50a controls supply of electric power to the reaction motor 31 based on the steering torque Th, the vehicle speed V, the rotation angle $\theta a$, the turning-side actual current value Ib which will be described later, and a pinion angle $\theta p$ which will be described later. The pinion angle $\theta p$ is calculated based on the rotation angle $\theta b$ of the turning motor 41.

The steering-side control unit 50a includes a steering angle calculating unit 52, a steering reaction force command value calculating unit 53, and a power supply control unit 54. The rotation angle $\theta a$ is input to the steering angle calculating unit 52. The steering angle calculating unit 52 converts the rotation angle $\theta a$ to total angles including a range exceeding 360°, for example, by counting the number of rotations of the reaction motor 31 from a steering neutral position which is a position of the steering wheel 11 when the vehicle travels straight ahead. The steering angle calculating unit 52 calculates the steering angle $\theta s$ by multiplying the total angle which is acquired through conversion by a conversion factor based on a rotation speed ratio of the reduction gear mechanism 32. For example, the steering angle $\theta s$ is set to be positive when it is an angle on the right side with respect to the steering neutral position and is set to be negative when it is an angle on the left side with respect to the steering neutral position. The calculated steering angle $\theta s$ is output to the turning-side control unit 50b.

A steering torque Th, the vehicle speed V, the turning-side actual current value Ib, and the pinion angle $\theta p$ are input to the steering reaction force command value calculating unit 53. The steering reaction force command value calculating unit 53 calculates a steering reaction force command value T* which is a target control value serving as a target of a steering reaction force based on the steering torque Th, the vehicle speed V, the turning-side actual current value Ib, and the pinion angle $\theta p$. The calculated steering reaction force command value T* is output to the power supply control unit 54.

The steering reaction force command value T*, the rotation angle $\theta a$, and the steering-side actual current value Ia are input to the power supply control unit 54. The power supply control unit 54 calculates a current command value Ia* for the reaction motor 31 based on the steering reaction force command value T*. The power supply control unit 54 calculates a difference between the current command value Ia* and a current value on a d-q coordinate system acquired by converting the steering-side actual current value Ia detected by the steering-side current sensor 55 based on the rotation angle $\theta a$, and controls supply of electric power to the reaction motor 31 such that the difference is cancelled out. Accordingly, the reaction motor 31 generates a torque based on the steering reaction force command value T*. It is possible to give an appropriate feeling of response based on a road reaction force to a driver.

The function of the turning-side control unit 50b will be described below. The vehicle speed V, the rotation angle $\theta b$, and the steering angle $\theta s$, are input to the turning-side control unit 50b. The turning-side control unit 50b controls supply of electric power to the turning motor 41 based on the vehicle speed V, the rotation angle $\theta b$, and the steering angle $\theta s$.

The turning-side control unit 50b includes a pinion angle calculating unit 61, a target pinion angle calculating unit 62, a pinion angle feedback control unit ("pinion angle F/B control unit" in the drawing) 63, and a power supply control unit 64.

The rotation angle $\theta b$ is input to the pinion angle calculating unit 61. The pinion angle calculating unit 61 converts the rotation angle $\theta b$ to a total angle including a range exceeding 360°, for example, by counting the number of rotations of the turning motor 41 from a neutral rack position which is a position of the turning shaft 14 when the vehicle travels straight ahead. The pinion angle calculating unit 61 calculates the pinion angle $\theta p$ which is an actual rotation angle of the pinion shaft 44 by multiplying the total angle which is acquired through conversion by a conversion factor based on a rotation speed ratio of the reduction gear mechanism 42. For example, the pinion angle $\theta p$ is set to be positive when it is an angle on the right side with respect to the neutral rack position and is set to be negative when it is an angle on the left side with respect to the neutral steering position. The turning motor 41 and the pinion shaft 44 operate in conjunction with each other via the reduction gear mechanism 42. Accordingly, the rotation angle $\theta b$ of the turning motor 41 and the pinion angle $\theta p$ have a correlation therebetween. The pinion angle $\theta p$ can be calculated from the rotation angle $\theta b$ of the turning motor 41 using the correlation. The pinion shaft 44 engages with the turning shaft 14. Accordingly, the pinion angle $\theta p$ and an amount of movement of the turning shaft 14 have a correlation therebetween. That is, the pinion angle $\theta p$ is a value in which a turning angle $\theta w$ of the turning wheels 16 is reflected. The calculated pinion angle $\theta p$ is output to the pinion angle F/B control unit 63 and the steering reaction force command value calculating unit 53.

The vehicle speed V and the steering angle $\theta s$ are input to the target pinion angle calculating unit 62. The target pinion angle calculating unit 62 calculates a target pinion angle θp* which is a target control value serving as a target angle of the pinion angle θp, based on the vehicle speed V and the steering angle θs.

Specifically, the target pinion angle calculating unit 62 includes a steering angle ratio changing and calculating unit 67 and an offset compensation and calculation unit 68. The vehicle speed V and the steering angle θs are input to the steering angle ratio changing and calculating unit 67. The steering angle ratio changing and calculating unit 67 calculates a converted angle θvg by adding an adjustment value 40a to the steering angle θs. The steering angle ratio changing and calculating unit 67 changes the adjustment value 40a for changing a steering angle ratio which is a ratio of the converted angle θvg to the steering angle θs, according to the vehicle speed V. For example, the adjustment value 40a is changed such that change of the converted angle θvg with respect to change of the steering angle θs is greater when the vehicle speed V is low than when the vehicle speed V is high. The acquired converted angle θvg is output to the offset compensation and calculation unit 68 and a converted angular velocity ωvg acquired from a differentiator 66 by differentiating the converted angle θvg is output to the offset compensation and calculation unit 68. The converted angle θvg is an angle serving as a base of the target pinion angle θp*. The pinion angle θp is controlled based on the target pinion angle θp*. Accordingly, the converted angle θvg and the pinion angle θp have a correlation therebetween. That is, the converted angular velocity ωvg acquired based on the converted angle θvg is a value in which the turning angle θw of the turning wheels 16 is reflected as a turning state of the turning mechanism TK.

The vehicle speed V, the converted angle θvg, the converted angular velocity ωvg, and a current command value Ib* which will be described later are input to the offset compensation and calculation unit 68. The offset compensation and calculation unit 68 calculates the target pinion angle θp* based on the vehicle speed V, the converted angle θvg, the converted angular velocity ωvg, and the current command value Ib* which will be described later. The offset compensation and calculation unit 68 has a function of calculating an offset value θofst which is a compensation value for the target pinion angle θp*, and is acquired in the course of calculating the target pinion angle θp*. The offset value θofst will be described later in detail. The acquired target pinion angle θp* is output to the pinion angle F/B control unit 63.

The target pinion angle θp* and the pinion angle θp are input to the pinion angle F/B control unit 63. The pinion angle F/B control unit 63 calculates a turning force command value Tp* which is a target control value serving as a target of a turning force in feedback control of the pinion angle θp such that the pinion angle θp follows the target pinion angle θp*. The acquired turning force command value Tp* is output to the power supply control unit 64.

The turning force command value Tp*, the rotation angle θb, and the turning-side actual current value Ib are input to the power supply control unit 64. The power supply control unit 64 calculates the current command value Ib* for the turning motor 41 based on the turning force command value Tp*. Then, the power supply control unit 64 calculates a difference between the current command value Ib* and a current value on the d-q coordinate system acquired by converting the turning-side actual current value Ib detected by the turning-side current sensor 65 based on the rotation angle θb, and controls supply of electric power to the turning motor 41 such that the difference is cancelled out. Accordingly, the turning motor 41 rotates by an angle corresponding to the turning force command value Tp*. The current command value Ib* acquired in the course of controlling supply of electric power to the turning motor 41 is output to the target pinion angle calculating unit 62.

The target pinion angle θp* is calculated to be a control value based on the converted angle θvg which is acquired from the steering angle θs. However, when a control value exceeding an output limit of the turning motor 41 is calculated as the target pinion angle θp*, for example, due to sudden change of the steering angle θs, the turning motor 41 needs to output an output power exceeding its limit. For the purpose of coping therewith, the steering control device 50, that is, the turning-side control unit 50b, has the function of the offset compensation and calculation unit 68.

The function of the offset compensation and calculation unit 68 will be described below in more detail. As illustrated in FIG. 8, the offset compensation and calculation unit 68 includes an offset value gradual-change processing unit 73, a limit value calculating unit 720, and an offset value acquisition processing unit 71.

The vehicle speed V, the converted angular velocity ωvg, and a previous offset value θofst(−) are input to the offset value gradual-change processing unit 73. The previous offset value θofst(−) is a value of the offset value θofst maintained in a previous cycle (one cycle before), and the offset value θofst is a compensation value for the target pinion angle θp*. The offset value gradual-change processing unit 73 calculates a decrease value θd and an offset residual value θofstc based on the vehicle speed V, the converted angular velocity ωvg, and the offset value θofst(−). The decrease value θd is a component that serves to gradually decrease the offset value θofst such that the target pinion angle θp* does not change suddenly with the decrease of the offset value θofst. The offset residual value θofstc is a component indicating a residual of the offset value θofst which is acquired by subtracting the decrease value θd from the offset value θofst(−). The decrease value θd and the offset residual value θofstc will be described later in detail. The acquired decrease value θd is output to the offset value acquisition processing unit 71. The value obtained by subtracting the offset residual value θofstc from the converted angle θvg is output to a subtractor 750 as a target pinion angle base value θpb* which is a base value of the target pinion angle θp* acquired from the subtractor 74. The offset residual value θofstc is output to an adder 76.

The current command value Ib* is input to the limit value calculating unit 720. The limit value calculating unit 720 calculates an angular velocity limit value ωpth based on the current command value Ib*. Specifically, the limit value calculating unit 720 calculates the angular velocity limit value ωpth which is a limit value of the angular velocity ωp of the turning motor 41 acquired from a relationship with the motor torque of the turning motor 41. The angular velocity limit value ωpth is acquired, for example, using I-ω characteristics illustrated in a portion (a) in FIG. 11 which is a relationship between the absolute value of an actual current value Ib corresponding to the motor torque of the turning motor 41 and the absolute value of the angular velocity ωp. The I-ω characteristics are characteristics which are acquired according to known N-T characteristics which are a relationship with the motor rotation speed with respect to the motor torque of the turning motor 41. Regarding the angular velocity limit value ωpth, the absolute value of the angular velocity ωp acquired based on the absolute value of the current command value Ib* is acquired as the angular velocity limit value ωpth. The acquired angular velocity limit value ωpth is output to the offset value acquisition processing unit 71.

The converted angle θvg, the decrease value θd, and the angular velocity limit value ωpth are input to the offset value acquisition processing unit 71. The offset value acquisition processing unit 71 calculates an excess control value θacc based on the converted angle θvg, the decrease value θd, and the angular velocity limit value ωpth. The excess control value θacc is a component corresponding to an excess over the output limit of the turning motor 41. The excess control value θacc will be described later in detail. The value obtained by subtracting the excess control value θacc from the target pinion angle base value θpb* is output to the pinion angle feedback (F/B) control unit 63 as the target pinion angle θp* acquired from the subtractor 750. The value obtained by adding the excess control value θacc to the offset residual value θofstc is output to the previous value maintaining unit 77 as the offset value θofst acquired from the adder 76, and is then output to the offset value gradual-change processing unit 73 as the previous offset value θofst(−) which is a value in a previous cycle (one cycle before).

The function of the offset value gradual-change processing unit 73 will be described below in detail. The same functions as those of the offset value gradual-change processing unit 73 according to the first embodiment will be omitted.

The converted angular velocity ωvg is input to the decrease value map calculating unit 82 illustrated in FIG. 9. The decrease value map calculating unit 82 includes a map in which a relationship between the absolute value of the converted angular velocity ωvg and a decrease base value θdb which is a base value of a decrease value θd is defined, and calculates the decrease base value θdb using the map and using the absolute value of the converted angular velocity ωvg as an input. The decrease base value θdb is a component that serves to gradually decrease the offset value θofst such that the target pinion angle θp* does not change suddenly with the decrease of the offset value θofst. In this case, the decrease base value θdb is calculated such that the absolute value thereof increases as the converted angular velocity ωvg, that is, the rate of change of the turning angle θw of the turning wheels 16, increases, in consideration of the turning state of the turning mechanism TK. The value obtained by multiplying the calculated decrease base value θdb by the decrease gain G is output to the lower limit guard processing unit 84 as a decrease value θd acquired from the multiplier 86.

The offset value θofst(−) is input to the sign processing unit 85. The sign processing unit 85 determines a sign of the offset value θofst(−) and calculates one of "1" and "−1" as a value corresponding to the sign. The sign processing unit 85 calculates "1" when the offset value θofst(−) is positive, and calculates "−1" when the offset value θofst(−) is negative. The value obtained by multiplying the decrease value θd by the calculated value of "1" or "−1" is output to a subtractor 88 as the final decrease value θd acquired from the multiplier 87. Then, the value obtained by subtracting the final decrease value θd from the offset value θofst(−) is output to the subtractor 74 and the adder 76 as the offset residual value θofstc acquired from the subtractor 88.

When the offset value θofst(−) is a non-zero value, the offset value gradual-change processing unit 73 operates such that the decrease value θd output from the lower limit guard processing unit 84 is reflected in the offset value θofst(−). The offset value gradual-change processing unit 73 operates such that the sign of the offset value θofst(−) is not inverted as the result of reflection of the decrease value θd. That is, when the absolute value of the offset value θofst(−) is less than the absolute value of the decrease value θd, the offset value gradual-change processing unit 73 operates such that the absolute value of the decrease value θd is the same as the absolute value of the offset value θofst(−).

The function of the offset value acquisition processing unit 71 will be described below in detail. As illustrated in FIG. 10, the offset value acquisition processing unit 71 includes a difference calculating unit 91, an absolute value processing unit 92, and a sign processing unit 93.

The converted angle θvg and the decrease value θd are input to the difference calculating unit 91. The difference calculating unit 91 calculates a difference base value Δθvgb which is acquired from a subtractor 95. The difference base value Δθvgb is acquired by subtracting a previous converted angle θvg(−) which is a value maintained in a previous cycle (one cycle before) in the previous value maintaining unit 94, from the converted angle θvg. The difference base value Δθvgb is a base value of a difference in the converted angle θvg between a current cycle in which the decrease value θd for the offset value θofst is not considered and the previous cycle. The value obtained by adding the decrease value θd to the acquired difference base value Δθvgb is output to the absolute value processing unit 92 and the sign processing unit 93 as a difference Δθvg acquired from an adder 96. The difference Δθvg is a total difference in the converted angle θvg between the current cycle in which the decrease value θd for the offset value θofst is considered and the previous cycle. When the offset value θofst is zero, the difference base value Δθvgb and the difference Δθvg have the same value.

The difference Δθvg is input to the absolute value processing unit 92. The absolute value processing unit 92 calculates an absolute value of the difference Δθvg. The value obtained by subtracting the angular velocity limit value ωpth from the acquired absolute value of the difference Δθvg is output to a multiplier 98 as an excess value Δθvgx acquired from a subtractor 97. The excess value Δθvgx is a component corresponding to an excess over the output limit of the turning motor 41 and indicates an absolute value of a component corresponding to an excess of the difference Δθvg over the angular velocity limit value ωpth. That is, the excess value Δθvgx is positive when the output limit of the turning motor 41 is exceeded, and is negative when the output limit of the turning motor 41 is not exceeded.

The difference Δθvg is input to the sign processing unit 93. The sign processing unit 93 determines a sign of the difference Δθvg and calculates one of "1" and "−1" as a value corresponding to the sign. The sign processing unit 93 calculates "1" when the difference Δθvg is positive, and calculates "−1" when the difference Δθvg is negative. The value obtained by multiplying the excess value Δθvgx by the calculated value of "1" or "−1" is output to a subtractor 750 and an adder 76 as the excess control value θacc acquired from the multiplier 98.

When the excess value Δθvgx is a positive value other than zero, the offset value acquisition processing unit 71 operates such that the excess value Δθvgx is reflected in the excess control value θacc. The state in which the excess value Δθvgx is positive is a state corresponding to a state in which the difference Δθvg exceeds the angular velocity limit value ωpth based on the current command value Ib* at that time, that is, the target pinion angle θp* exceeding the output limit of the turning motor 41 is calculated (hereinafter referred to as a "limit state").

When the excess value Δθvgx is zero or negative, the offset value acquisition processing unit 71 operates such that the excess value Δθvgx is not reflected in the excess control value θacc. That is, the offset value acquisition processing unit 71 operates such that the excess value Δθvgx is zero when the excess value Δθvgx is zero or negative. The state in which the excess value Δθvgx is zero or negative is a state not corresponding to the limit state in which the difference Δθvg does not exceed the angular velocity limit value ωpth based on the current command value Ib* at that time, that is, the target pinion angle θp* with a margin with respect to the output limit of the turning motor 41 is calculated.

Operations of this embodiment will be described below. Portions (a) to (c) in FIG. 11 illustrate various change modes in an example in which the excess value Δθvgx is positive, that is, the limit state has been reached, at the timing of time t1. The following description is based on the premise that the offset value θofst at time "0" is zero and the vehicle speed V is constant. In the portion (a) in FIG. 11, the horizontal axis represents the absolute value of the angular velocity ωp and the vertical axis represents the absolute value of the actual current value Ib.

As illustrated in the portion (a) in FIG. 11, at the timing of time t1, the limit state is reached due to an excess a of the difference Δθvg over the angular velocity limit value ωpth acquired from the current command value Ib* at that time.

This means that sudden change of the converted angle θvg indicated by an alternate long and short dash line in the graph is caused as illustrated in the portion (b) in FIG. 11. At the timing of time t1, the offset value acquisition processing unit 71 operates such that the excess a is calculated as the excess value Δθvgx, that is, the excess control value θacc. The acquired excess control value θacc is subtracted from the target pinion angle base value θpb* at that time to perform compensation for the target pinion angle θp* by the function of the offset compensation and calculation unit 68.

In this case, as illustrated in the portion (c) in FIG. 11, the offset value acquisition processing unit 71 operates such that the offset value θofst representing the excess a is calculated. After time t1, the offset value gradual-change processing unit 73 operates such that the offset value θofst, that is, the offset residual value θofstc, changes to decrease gradually. The offset value θofst changes to decrease gradually up to time t2 at which it becomes zero. The acquired offset value θofst serves as the offset residual value θofstc and is subtracted from the converted angle θvg at that time to perform compensation for the target pinion angle θp* by the function of the offset compensation and calculation unit 68.

As a result, as indicated by a solid line in the portion (b) in FIG. 11, when the state corresponding to the limit state is reached, the target pinion angle θp* which is a target control value after time t1 is shifted into the output limit of the turning motor 41 through compensation using the excess control value θacc. Particularly, at the instantaneous timing corresponding to the limit state, compensation is performed such that the target pinion angle θp* is shifted to the output limit of the turning motor 41.

Thereafter, as indicated by a solid line in the drawing, the target pinion angle θp* approaches the converted angle θvg which is actually calculated, that is, the original target pinion angle θp*, as the offset residual value θofstc decreases gradually. The target pinion angle θp* changes to reach the converted angle θvg which is actually calculated, that is, the original target pinion angle θp*, at the timing of time t2 at which the offset residual value θofstc is zero.

Advantages of this embodiment will be described below. In this embodiment, as indicated by the solid line in the portion (b) in FIG. 11, even when the limit state is reached, it is possible to make it difficult to cause a state in which the turning motor 41 needs to output power over the limit. Accordingly, it is possible to curb generation of vibration or noise in the turning motor 41.

According to this embodiment, the excess control value θacc which is a difference between the angular velocity limit value ωpth and the difference Δθvg is reflected in the offset value θofst. Accordingly, it is possible to appropriately make it difficult to cause the limit state.

Here, since the offset value θofst forcibly shifts the converted angle θvg which is actually calculated, that is, the original target pinion angle θp*, the offset value θofst needs to be cancelled out as soon as possible, but an excessive decrease value of the offset value θofst appears as movement of the turning mechanism TK which is not intended by a driver.

Therefore, the offset value gradual-change processing unit 73 has the functions of the decrease gain map calculating unit 81 that considers the traveling state of the vehicle and the decrease value map calculating unit 82 that considers the turning state of the turning mechanism TK. Accordingly, the decrease value Od for decreasing the offset value θofst is increased as the vehicle speed V increases and as the change amount of the turning angle θw of the turning wheels 16 increases. As a result, it is possible to curb a driver's discomfort and to cancel out the offset value θofst as soon as possible.

The difference base value Δθvgb may be acquired from a difference between the target pinion angle θp* which is acquired based on the converted angle θvg at that time and the previous value thereof, or may be acquired from a difference between the steering angle θs at that time and the previous value thereof.

The offset compensation and calculation unit 68 according to this embodiment may be added as the function of the steering-side control unit 50a. This is effective when the steering reaction force command value T* is calculated to conform to the pinion angle θp.

Control of the turning motor 41 may be performed based on a movement amount of the turning shaft 14 which is directly detected, instead of controlling the pinion angle θp. In this case, in the aforementioned embodiment, the control values or the like associated with the pinion angle θp are replaced with control values associated with the movement amount of the turning shaft 14.

The sign processing unit 85 may calculate and output "0 (zero)" when the offset value θofst(−) is zero. In this case, when the offset value θofst(−) is zero, the decrease value θd is zero. That is, in this modified example, the offset value gradual-change processing unit 73 can operate such that the decrease value θd output from the lower limit guard processing unit 84 is not reflected in the offset residual value θofstc when the offset value θofst(−) is zero.

The sign processing unit 93 may calculate and output "0 (zero)" when the difference Δθvg is zero. In this case, when the difference Δθvg is zero, the excess control value θacc is zero. That is, in this modified example, the offset value acquisition processing unit 71 can operate such that the excess value Δθvgx is not reflected in the excess control value θacc when the difference Δθvg is zero.

The steering angle ratio changing and calculating unit 67 may change the steering angle ratio, for example, according to a yaw rate which is detected by a yaw rate sensor of the vehicle in addition to the vehicle speed V. In this case, there is a state corresponding to the limit state similarly to the aforementioned embodiment. Similarly to the aforementioned embodiment, this can also be solved by employing the offset compensation and calculation unit 68 according to the aforementioned embodiment. This modified example can also be applied to a case in which the steering angle ratio is variable according to a lateral acceleration output from a lateral acceleration sensor of the vehicle in addition to the vehicle speed V.

The steering reaction force command value calculating unit 53 needs to use at least the steering torque Th to calculate the steering reaction force command value T*, and may not use the vehicle speed V or may use a combination thereof with another element.

In the aforementioned embodiment, the steering angle ratio may be fixed. In this case, the steering angle ratio changing and calculating unit 67 may be omitted. In the aforementioned embodiment, the turning motor 41 may employ, for example, a structure in which the turning motor 41 is provided coaxial with the turning shaft 14 or a structure in which the turning motor 41 is connected to the turning shaft 14 via a belt reduction gear using a ball screw mechanism.

In the aforementioned embodiment, the CPU constituting the steering control device 50 may be realized as one or more processors that execute a computer program, one or more dedicated hardware circuits such as application-specific integrated circuits that perform at least some process of various processes, or a circuit including a combination of the processor and the dedicated hardware circuit. The memory may be constituted using all available mediums that can be accessed by a general-purpose or dedicated computer.

In the aforementioned embodiment, the steering system 10 employs a linkless structure in which the steering mechanism SK and the turning mechanism TK are normally mechanically disconnected from each other, but the disclosure is not limited thereto and a structure in which the steering mechanism SK and the turning mechanism TK can be mechanically disconnected by a clutch 21 may be employed as indicated by an alternate long and two short dashes line in FIG. 6. The steering system 10 may be an electric power steering system that applies an assist force which is a force for assisting with steering of the steering wheel 11. In this case, the steering wheel 11 is mechanically connected to the pinion shaft 13 via the steering shaft 12.

Third Embodiment

A third embodiment will be described below. A steering system 10 of a vehicle according to the third embodiment is illustrated in FIG. 12. The same elements as in the first embodiment or the second embodiment will be referred to by the same reference signs and description thereof will be omitted.

The steering mechanism SK includes the reaction motor 31, the reduction gear mechanism 32, the rotation angle sensor 33, and the torque sensor 34 as a configuration for generating a steering reaction force. A steering reaction force is a force which acts in a direction opposite to an operating direction of the steering wheel 11 by a driver. An appropriate feeling of response can be given to the driver by applying the steering reaction force to the steering wheel 11.

The reaction motor 31 is a source of the steering reaction force. For example, a three-phase brushless motor is employed as the reaction motor 31. The reaction motor 31, accurately, a rotation shaft thereof, is connected to the steering shaft 12 via the reduction gear mechanism 32. A torque of the reaction motor 31 is applied as a steering reaction force to the steering shaft 12.

The rotation angle sensor 33 is provided in the reaction motor 31. The rotation angle sensor 33 detects a rotation angle θa of the reaction motor 31. The rotation angle θa of the reaction motor 31 is used to calculate a steering angle θs. The reaction motor 31 and the steering shaft 12 operate in conjunction with each other via the reduction gear mechanism 32. Accordingly, the rotation angle θa of the reaction motor 31 and the rotation angle of the steering shaft 12, that is, a steering angle θs which is a rotation angle of the steering wheel 11, have a correlation. As a result, the steering angle θs can be calculated on the basis of the rotation angle θa of the reaction motor 31.

A vehicle power supply 502 which is a start switch of the vehicle such as an ignition switch is connected to the steering control device 50. The vehicle power supply 502 detects an ON/OFF state of the start switch of the vehicle and outputs a start signal Sig when the ON state is detected.

The configuration of the steering control device 50 will be described below. The steering control device 50 includes a central processing unit (CPU) and a memory which are not illustrated and the CPU executes a program stored in the memory at intervals of a predetermined operation cycle. Accordingly, various processes are performed.

Some processes which are performed by the steering control device 50 are illustrated in FIG. 13. The processes illustrated in FIG. 13 are some processes which are realized by causing the CPU to execute a program stored in the memory for each kind of the processes which are realized.

The function of the steering-side control unit 50a will be described below. The steering torque Th, the vehicle speed V, the rotation angle θa, the turning-side actual current value Ib which will be described later, and a pinion angle θp which will be described later are input to the steering-side control unit 50a. The steering-side control unit 50a controls supply of electric power to the reaction motor 31 based on the steering torque Th, the vehicle speed V, the rotation angle θa, the turning-side actual current value Ib which will be described later, and a pinion angle θp which will be described later. The pinion angle θp is calculated based on the rotation angle θb of the turning motor 41.

The steering-side control unit 50a includes a steering angle calculating unit 52, a steering reaction force command value calculating unit 53, and a power supply control unit 54. The rotation angle θa is input to the steering angle calculating unit 52. The steering angle calculating unit 52 converts the rotation angle θa to total angles including a range exceeding 360°, for example, by counting the number of rotations of the reaction motor 31 from a steering neutral position which is a position of the steering wheel 11 when the vehicle travels straight ahead. The steering angle calculating unit 52 calculates the steering angle θs by multiplying the total angle which is acquired through conversion by a conversion factor based on a rotation speed ratio of the reduction gear mechanism 32. For example, the steering angle θs is set to be positive when it is an angle on the right side with respect to the steering neutral position θs0 and is set to be negative when it is an angle on the left side with respect to the steering neutral position. The calculated steering angle θs is output to the turning-side control unit 50b.

A steering torque Th, the vehicle speed V, the turning-side actual current value Ib, and the pinion angle θp are input to the steering reaction force command value calculating unit 53. The steering reaction force command value calculating unit 53 calculates a steering reaction force command value T* which is a target control value serving as a target of a steering reaction force, based on the steering torque Th, the vehicle speed V, the turning-side actual current value Ib, and the pinion angle θp. The calculated steering reaction force command value T* is output to the power supply control unit 54.

The steering reaction force command value T*, the rotation angle θa, and the steering-side actual current value Ia are input to the power supply control unit 54. The power supply control unit 54 calculates a current command value Ia* for the reaction motor 31 based on the steering reaction force command value T*. The power supply control unit 54 calculates a difference between the current command value Ia* and a current value on a d-q coordinate system acquired by converting the steering-side actual current value Ia detected by the steering-side current sensor 55 based on the rotation angle θa, and controls supply of electric power to the reaction motor 31 such that the difference is cancelled out. Accordingly, the reaction motor 31 generates a torque based on the steering reaction force command value T*. It is possible to give an appropriate feeling of response based on a road reaction force to a driver.

The function of the turning-side control unit 50b will be described below. The vehicle speed V, the rotation angle θb, and the steering angle θs, are input to the turning-side control unit 50b. The turning-side control unit 50b controls supply of electric power to the turning motor 41 based on the vehicle speed V, the rotation angle θb, the steering angle θs, and the start signal Sig which will be described later.

The turning-side control unit 50b includes a pinion angle calculating unit 61, a target pinion angle calculating unit 62, a pinion angle feedback control unit ("pinion angle F/B control unit" in the drawing) 63, and a power supply control unit 64.

The rotation angle θb is input to the pinion angle calculating unit 61. The pinion angle calculating unit 61 converts the rotation angle θb to a total angle including a range exceeding 360°, for example, by counting the number of rotations of the turning motor 41 from a neutral rack position which is a position of the turning shaft 14 when the vehicle travels straight ahead. The pinion angle calculating unit 61 calculates the pinion angle θp which is an actual rotation angle of the pinion shaft 44 by multiplying the total angle which is acquired through conversion by a conversion factor based on a rotation speed ratio of the reduction gear mechanism 42. For example, the pinion angle θp is set to be positive when it is an angle on the right side with respect to a midpoint θp0 which is neutral rack position and is set to be negative when it is an angle on the left side with respect to the neutral rack position. The turning motor 41 and the pinion shaft 44 operate in conjunction with each other via the reduction gear mechanism 42. Accordingly, the rotation angle θb of the turning motor 41 and the pinion angle θp have a correlation therebetween. The pinion angle θp can be calculated from the rotation angle θb of the turning motor 41 using the correlation. The pinion shaft 44 engages with the turning shaft 14. Accordingly, the pinion angle θp and an amount of movement of the turning shaft 14 have a correlation therebetween. That is, the pinion angle θp is a value in which a turning angle θw of the turning wheels 16 is reflected and is an example of a turning correlation angle. The calculated pinion angle θp is output to the target pinion angle calculating unit 62, the pinion angle F/B control unit 63, and the steering reaction force command value calculating unit 53.

The vehicle speed V, the steering angle θs, the pinion angle θp, and the start signal Sig are input to the target pinion angle calculating unit 62. The target pinion angle calculating unit 62 calculates a target pinion angle θp* which is a target control value serving as a target angle of the pinion angle θp, based on the vehicle speed V, the steering angle θs, the pinion angle θp, and the start signal Sig.

Specifically, the target pinion angle calculating unit 62 includes a steering angle ratio changing and calculating unit 67 and an offset compensation and calculation unit 68. The vehicle speed V and the steering angle θs are input to the steering angle ratio changing and calculating unit 67. The steering angle ratio changing and calculating unit 67 calculates a converted angle θvg by adding an adjustment value Δθa to the steering angle θs. The steering angle ratio changing and calculating unit 67 changes the adjustment value Δθa for changing a steering angle ratio which is a ratio of the converted angle θvg to the steering angle θs, according to the vehicle speed V. For example, the adjustment value Δθa is changed such that change of the converted angle θvg with respect to change of the steering angle θs is greater when the vehicle speed V is low than when the vehicle speed V is high. The acquired converted angle θvg is output to the offset compensation and calculation unit 68 and a subtractor 69 and a converted angular velocity ωvg acquired from a differentiator 66 by differentiating the converted angle θvg is output to the offset compensation and calculation unit 68. The converted angle θvg is an angle serving as a base of the target pinion angle θp*. The pinion angle θp is controlled based on the target pinion angle θp*. Accordingly, the converted angle θvg and the pinion angle θp have a correlation therebetween. That is, the converted angular velocity ωvg acquired based on the converted angle θvg is a value in which the turning angle θw of the turning wheels 16 is reflected as a turning state of the turning mechanism TK. The converted angle θvg is a value in which the turning angle θw of the turning wheels 16 is reflected. Accordingly, the steering angle ratio is an example of a predetermined correspondence between the steering angle θs and the turning angle θw of the turning wheels 16.

The vehicle speed V, the pinion angle θp, the converted angle θvg, the converted angular velocity ωvg, and the start signal Sig are input to the offset compensation and calculation unit 68. The offset compensation and calculation unit 68 calculates an offset value θofst which is a compensation value at the time of calculating the target pinion angle θp* based on the vehicle speed V, the pinion angle θp, the converted angle θvg, the converted angular velocity ωvg, and the start signal Sig. The offset value θofst will be described later in detail. The value obtained by subtracting the acquired offset value θofst from the converted angle θvg is output to the pinion angle F/B control unit 63 as a target pinion angle θp* acquired from the subtractor 69.

The target pinion angle θp* and the pinion angle θp are input to the pinion angle F/B control unit 63. The pinion angle F/B control unit 63 calculates a turning force command value Tp* which is a target control value serving as a target of a turning force in feedback control of the pinion angle θp such that the pinion angle θp conforms to the target pinion angle θp*. The acquired turning force command value Tp* is output to the power supply control unit 64.

The turning force command value Tp*, the rotation angle θb, and the turning-side actual current value Ib are input to the power supply control unit 64. The power supply control unit 64 calculates a current command value Ib* for the turning motor 41 based on the turning force command value Tp*. Then, the power supply control unit 54 calculates a difference between the current command value Ib* and a current value on the d-q coordinate system acquired by converting the turning-side actual current value Ib detected by the turning-side current sensor 65 based on the rotation angle θb, and controls supply of electric power to the turning motor 41 such that the difference is cancelled out. Accordingly, the turning motor 41 rotates by an angle corresponding to the turning force command value Tp*.

In the steering system 10, the reaction motor 31 and the turning motor 41 are not supplied with electric power by the power supply control units 54 and 64 when the start switch of the vehicle is in the OFF state. That is, even if the steering wheel 11 is steered when the start switch of the vehicle is in the OFF state, the turning wheels 16 are not turned. When the steering wheel 11 is steered in this state, the positional relationship between the steering wheel 11 and the turning wheels 16 departs from a predetermined correspondence based on the steering angle ratio. For the purpose of coping therewith, the steering control device 50, that is, the turning-side control unit 50b, has the function of the offset compensation and calculation unit 68.

The function of the offset compensation and calculation unit 68 will be described below in more detail. As illustrated in FIG. 14, the offset compensation and calculation unit 68 includes an offset value acquisition processing unit 71, a calculated value switching unit 72, and an offset value gradual-change processing unit 73.

The converted angle θvg and the pinion angle θp are input to the offset value acquisition processing unit 71. The offset value acquisition processing unit 71 calculates a starting shift value Δθvg_p which is acquired from a subtractor 74 by subtracting the pinion angle θp from the converted angle θvg. The acquired starting shift value Δθvg_p is output to the calculated value switching unit 72.

The start signal Sig, the starting shift value Δθvg_p, and a previous offset value θofst(−) which is a value maintained in the previous cycle (one cycle before) in a previous value maintaining unit 75 are input to the calculated value switching unit 72. The starting shift value Δθvg_p is input to a first input N1 of the calculated value switching unit 72 and the offset value θofst(−) is input to a second input N2 of the calculated value switching unit 72.

When the start signal Sig is input, the calculated value switching unit 72 controls a selection state such that the starting shift value Δθvg_p input to the first input N1 is output as an offset base value θofstb which is a base value of the offset value θofst. The selection state in which the starting shift value Δθvg_p is output as the offset base value θofstb instantaneously occurs at the time of inputting of the start signal Sig. When the start signal Sig is input, it is determined that the start switch of the vehicle is switched from the OFF state to the ON state at a starting time.

On the other hand, when the start signal Sig is not input, the calculated value switching unit 72 controls the selection state such that the offset value θofst(−) input to the second input N2 is output as the offset base value θofstb. The selection state in which the offset value θofst(−) is output as the offset base value θofstb is continuously maintained in a period of time in which the start signal Sig is not input. The period of time in which the start signal Sig is not input is a period of time in which it is determined that it is not a starting time. The period of time in which it is not a starting time is a period of time in which the start switch of the vehicle is in the ON or OFF state or a period of time in which the start switch is switched from the ON state to the OFF state.

As the offset base value θofstb which is selected as an appropriate value in this way, the starting shift value Δθvg_p calculated by the offset value acquisition processing unit 71 is output to the offset value gradual-change processing unit 73 at the time of inputting of the start signal Sig. As the offset base value θofstb, the offset value θofst(−) which is a previous value of the offset value gradual-change processing unit 73 is output to the offset value gradual-change processing unit 73 in the period of time in which the start signal Sig is not input.

The starting shift value Δθvg_p is a non-zero value when the positional relationship between the steering wheel 11 and the turning wheels 16 departs from the predetermined correspondence based on the steering angle ratio. On the other hand, when it is determined that it is a starting time, the calculated value switching unit 72 outputs the starting shift value Δθvg_p which is input to the first input N1 thereof. That is, the starting shift value Δθvg_p is a control value corresponding to an amount by which the turning wheels 16 need to be turned in a first cycle immediately after the starting. The calculated value switching unit 72 operates such that an amount by which the position relationship between the steering wheel 11 and the turning wheels 16 departs from the predetermined correspondence based on the steering angle ratio due to steering of the steering wheel 11 when the start switch of the vehicle is in the OFF state is reflected in the offset base value θofstb using the starting shift value Δθvg_p.

On the other hand, even when it is determined that it is not a starting time, the starting shift value Δθvg_p has a non-zero value. In this regard, since the starting shift value Δθvg_p input to the first input N1 is not output when it is determined that it is not a starting time, the calculated value switching unit 72 operates such that the starting shift value Δθvg_p which can be generated at a time other than the time when it is determined that it is a starting time is not reflected in the offset base value θofstb.

The vehicle speed V, the converted angular velocity ωvg, and the offset base value θofstb are input to the offset value gradual-change processing unit 73. Specifically, as illustrated in FIG. 15, the offset value gradual-change processing unit 73 includes a decrease gain map calculating unit 81, a decrease value map calculating unit 82, a storage unit 83, a lower limit guard processing unit 84, and a sign processing unit 85.

The vehicle speed V is input to the decrease gain map calculating unit 81. The decrease gain map calculating unit 81 includes a map in which a relationship between the vehicle speed V and a decrease gain G is defined and calculates the decrease gain G using the map and using the vehicle speed V as an input. The decrease gain G is a gain serving to gradually decrease the offset value θofst such that the target pinion angle θp* does not change suddenly with the decrease of the offset value θofst. In this case, the decrease gain G is calculated such that the absolute value thereof increases as the vehicle speed V increases, in consideration of a traveling state of the vehicle. The calculated decrease gain G is output to a multiplier 86.

The converted angular velocity ωvg is input to the decrease value map calculating unit 82. The decrease value map calculating unit 82 includes a map in which a relationship between the absolute value of the converted angular velocity ωvg and a decrease base value θdb which is a base value of a decrease value θd is defined, and calculates the decrease base value θdb using the map and using the absolute value of the converted angular velocity ωvg as an input. The decrease base value θdb is a component that serves to gradually decrease the offset value θofst such that the target pinion angle θp* does not change suddenly with the decrease of the offset value θofst. In this case, the decrease base value θdb is calculated such that the absolute value thereof increases as the converted angular velocity ωvg, that is, the rate of change of the turning angle θw of the turning wheels 16, increases, in consideration of the turning state of the turning mechanism TK. The value obtained by multiplying the calculated decrease base value θdb by the decrease gain G is output to the lower limit guard processing unit 84 as a decrease value θd acquired from the multiplier 86.

The storage unit 83 is a predetermined storage area of a memory (not illustrated) in which a minimum value θdmin of the decrease value θd is stored. The minimum value θdmin is a component that serves to decrease the offset value θofst such that the offset value θofst is not constantly left. The minimum value θdmin is set to a value in a range which is experimentally acquired as an index for securing a minimum of the decrease value θd even when the decrease value θd output from the multiplier 86 is less than the minimum value θdmin. The acquired minimum value θdmin is output to the lower limit guard processing unit 84.

The decrease value θd output from the multiplier 86 and the minimum value θdmin output from the storage unit 83 are input to the lower limit guard processing unit 84. The decrease value θd is input to a first input M1 of the lower limit guard processing unit 84 and the minimum value θdmin is input to a second input M2 of the lower limit guard processing unit 84. The lower limit guard processing unit 84 is configured to switch its selection state such that one of the decrease value θd and the minimum value θdmin is output as the decrease value θd.

Specifically, the lower limit guard processing unit 84 determines whether the decrease value θd input to the first input M1 is equal to or greater than the minimum value θdmin. When the decrease value θd input to the first input M1 is equal to or greater than the minimum value θdmin, the lower limit guard processing unit 84 controls the selection state of the lower limit guard processing unit 84 such that the decrease value θd input to the first input M1 is output as the final decrease value θd. On the other hand, when the decrease value θd input to the first input M1 is less than the minimum value θdmin, the lower limit guard processing unit 84 controls the selection state of the lower limit guard processing unit 84 such that the minimum value θdmin is output as the final decrease value θd. That is, the lower limit guard processing unit 84 operates to decrease the offset value θofst by at least the minimum value θdmin such that the offset value θofst is not constantly left. The decrease value θd which is selected as an appropriate value in this way is output to a multiplier 87.

The offset base value θofstb is input to the sign processing unit 85. The sign processing unit 85 determines a sign of the offset base value θofstb and calculates one of "1" and "−1" as a value corresponding to the sign. The sign processing unit 85 calculates "1" when the offset base value θofstb is positive, and calculates "−1" when the offset base value θofstb is negative. The value obtained by multiplying the decrease value θd by the calculated value of "1" or "−1" is output to a subtractor 88 as the final decrease value θd acquired from the multiplier 87. Then, the value obtained by subtracting the final decrease value θd from the offset base value θofstb is output to the subtractor 69 as the offset value θofst acquired from the subtractor 88.

When the offset value θofst is a non-zero value, the offset value gradual-change processing unit 73 operates such that the decrease value θd output from the lower limit guard processing unit 84 is reflected in the offset value θofst. On the other hand, when the offset value θofst is zero, the offset value gradual-change processing unit 73 operates such that the decrease value θd output from the lower limit guard processing unit 84 is not reflected in the offset value θofst. The offset value gradual-change processing unit 73 operates such that the sign of the offset base value θofstb is not inverted as the result of reflection of the decrease value θd. That is, when the absolute value of the offset base value θofstb is less than the absolute value of the decrease value θd, the offset value gradual-change processing unit 73 operates such that the absolute value of the decrease value θd is the same as the absolute value of the offset base value θofstb.

Operations of this embodiment will be described below. Portions (a) to (c) in FIG. 16 illustrate various change modes in an example in which it is determined that it is a starting time at the timing of time t1. The following description is based on the premise that the offset value θofst at time "0" is zero and the vehicle speed V is constant.

The portion (a) in FIG. 16 illustrates the positional relationship between the steering wheel 11 and the turning angle θw of the turning wheels 16 at time "0." The illustrated state is a state in which the positional relationship between the steering wheel 11 and the turning wheels 16 departs from the predetermined correspondence based on the steering angle ratio due to steering of the steering wheel 11 to the right side by a predetermined angle when the turning angle θw of the turning wheels 16 is the midpoint θw0 corresponding to the neutral rack position and the start switch of the vehicle is in the OFF state. That is, the illustrated state is a state "θvg≠θp" in which the converted angle θvg acquired based on the steering angle θs and the pinion angle θp acquired based on the pinion shaft 44 do not match each other.

At the timing of time t1, the start switch of the vehicle is switched to the ON state and then the offset value acquisition processing unit 71 operates such that the difference between the converted angle θvg and the pinion angle θp is calculated as the starting shift value Δθvg_p.

In this case, as illustrated in the portion (c) in FIG. 16, the calculated value switching unit 72 operates such that the offset base value θofstb representing the starting shift value Δθvg_p a is calculated, and this is calculated as the offset value θofst. After time t1, the offset value θofst changes to decrease gradually due to the function of the offset value gradual-change processing unit 73. The offset value θofst changes to decrease gradually up to time t2 at which it becomes zero. The offset value θofst which changes in this way is subtracted from the converted angle θvg at that time to perform compensation for the target pinion angle θp* by the function of the offset compensation and calculation unit 68.

As a result, as indicated by an alternate long and short dash line in the portion (b) in FIG. 16, when it is determined that it is a starting time, the target pinion angle θp* to which the turning wheels 16 need to be turned in the first cycle after the starting is inherently calculated based on the converted angle θvg at that time. On the other hand, as indicated by a solid line in the drawing, after the timing of time t1 at which it is determined that it is a starting time, the target pinion angle θp* is shifted in a direction in which the motor torque of the turning motor 41 decreases such that the turning wheels 16 are not suddenly turned, through compensation using the offset value θofst. At the timing at which it is determined that it is a starting time, compensation is performed for the target pinion angle θp* (i.e., the target pinion angle θp* is controlled) such that the motor torque of the turning motor 41 is zero.

Thereafter, as indicated by a solid line in the drawing, the target pinion angle θp* approaches the converted angle θvg which is actually calculated and which is indicated by the alternate long and short dash line in the drawing, that is, the original target pinion angle θp*, as the offset value θofst decreases gradually. The target pinion angle θp* changes to reach the converted angle θvg which is actually calculated, that is, the original target pinion angle θp*, at the timing of time t2 at which the offset value θofst is zero.

Advantages of this embodiment will be described below. In this embodiment, as indicated by the solid line in the portion (b) in FIG. 16, when it is determined that it is a starting time, it is possible to curb sudden turning of the turning wheels 16 in a first cycle after the starting even if the target pinion angle θp* to which the turning wheels 16 need to be turned in the first cycle after the starting could be originally calculated based on the converted angle θvg at that time. Accordingly, it is possible to curb discomfort given to a driver.

In this embodiment, the starting shift value Δθvg_p is acquired as the offset value θofst. Accordingly, even when the positional relationship between the steering angle θs and the turning angle θw, that is, the pinion angle θp, departs from the predetermined correspondence based on the steering angle ratio, it is possible to curb sudden turning of the turning wheels 16 to a position corresponding to the steering angle θs in the first cycle after the starting.

When a configuration for changing the steering angle ratio is provided as in this embodiment, it is particularly effective to acquire, as the offset value θofst, the starting shift value Δθvg_p which is a difference between the converted angle θvg and the pinion angle θp in the first cycle after the starting.

Here, since the offset value θofst forcibly shifts the converted angle θvg which is actually calculated, that is, the original target pinion angle θp*, the offset value θofst needs to be cancelled out as soon as possible, but an excessive decrease value of the offset value θofst appears as movement of the turning mechanism TK which is not intended by a driver.

Therefore, the offset value gradual-change processing unit 73 has the functions of the decrease gain map calculating unit 81 that considers the traveling state of the vehicle and the decrease value map calculating unit 82 that considers the turning state of the turning mechanism TK. Accordingly, the decrease value θd for decreasing the offset value θofst is increased as the vehicle speed V increases and as the change amount of the turning angle θw of the turning wheels 16 increases. As a result, it is possible to curb a driver's discomfort and to cancel out the offset value θofst as soon as possible.

The offset value gradual-change processing unit 73 has the function of the lower limit guard processing unit 84 that considers the minimum value θdmin. Accordingly, it is possible to prevent the offset value θofst from being constantly left and to effectively decrease the offset value θofst.

In the decrease value map calculating unit 82, a pinion angular velocity which is acquired by differentiating the pinion angle θp may be used instead of the converted angular velocity ωvg. In addition, the decrease value map calculating unit 82 may calculate the decrease base value θdb corresponding to the angle at that time using the steering angle θs or the pinion angle θp.

The offset value θofst may not be acquired from the starting shift value Δθvg_p, but may be acquired from a difference between the steering angle θs and a converted pinion angle which is acquired by inversely transforming the pinion angle θp based on the steering angle ratio or may be acquired from a difference between a value which is acquired by converting the steering angle θs to a movement amount of the turning shaft 14 and the actual movement amount of the turning shaft 14. In addition, the offset value θofst may be acquired from a difference between the steering angle θs at the time of turning off the start switch of the vehicle immediately before and the steering angle θs at the time of starting. In this case, a converted difference which is acquired by converting the difference based on the steering angle ratio may be used.

When the target control value, for which compensation is performed, is the turning force command value Tp* or the current command value Ib*, the offset value θofst may be acquired, for example, from a difference between the target pinion angle θp* and the pinion angle θp.

The offset compensation and calculation unit 68 according to this embodiment may be added as a function of the steering-side control unit 50a. This is effective when the steering reaction force command value T* is calculated to conform to the pinion angle θp.

Control of the turning motor 41 may be performed based on a movement amount of the turning shaft 14 which is directly detected, instead of controlling the pinion angle θp. In this case, in the aforementioned embodiment, the control values or the like associated with the pinion angle θp are replaced with control values associated with the movement amount of the turning shaft 14.

The sign processing unit 85 may calculate and output "0 (zero)" when the offset base value θofstb is zero. In this case, when the offset base value θofstb is zero, the decrease value θd is zero. That is, in this modified example, the offset value gradual-change processing unit 73 can operate such that the decrease value θd output from the lower limit guard processing unit 84 is not reflected in the offset value θofst when the offset value θofst is zero.

The steering angle ratio changing and calculating unit 67 may change the steering angle ratio, for example, according to a yaw rate which is detected by a yaw rate sensor of the vehicle in addition to the vehicle speed V. In this case, there is a state in which the positional relationship between the steering wheel 11 and the turning wheels 16 departs from the predetermined correspondence based on the steering angle ratio due to steering of the steering wheel 11 when the start switch of the vehicle is in the OFF state similarly to the aforementioned embodiment. Similarly to the aforementioned embodiment, this can also be solved by employing the offset compensation and calculation unit 68 according to the aforementioned embodiment. This modified example can also be applied to a case in which the steering angle ratio is variable according to a lateral acceleration output from a lateral acceleration sensor of the vehicle in addition to the vehicle speed V.

The steering reaction force command value calculating unit 53 needs to use at least the steering torque Th to calculate the steering reaction force command value T*, and may not use the vehicle speed V or may use a combination thereof with another element.

In the aforementioned embodiment, the steering angle ratio may be fixed. In this case, the steering angle ratio changing and calculating unit 67 may be omitted. The turning motor 41 may employ, for example, a structure in which the turning motor 41 is provided coaxial with the turning shaft 14 or a structure in which the turning motor 41 is connected to the turning shaft 14 via a belt reduction gear using a ball screw mechanism.

In the aforementioned embodiment, the CPU constituting the steering control device 50 may be realized as one or more processors that execute a computer program, one or more dedicated hardware circuits such as application-specific integrated circuits that perform at least some process of various processes, or a circuit including a combination of the processor and the dedicated hardware circuit. The memory may be constituted using all available mediums that can be accessed by a general-purpose or dedicated computer.

In the aforementioned embodiment, the steering system 10 employs a linkless structure in which the steering mechanism SK and the turning mechanism TK are normally mechanically disconnected from each other, but the disclosure is not limited thereto and a structure in which the steering mechanism SK and the turning mechanism TK can be mechanically disconnected by a clutch 21 may be employed as indicated by an alternate long and two short dashes line in FIG. 12. The steering system 10 may be an electric power steering system that applies an assist force which is a force for assisting with steering of the steering wheel 11. In this case, the steering wheel 11 is mechanically connected to the pinion shaft 13 via the steering shaft 12.

What is claimed is:

1. A steering control device configured to control a steering system including a turning mechanism that includes a motor configured to generate a motor torque that serves as power for moving a turning shaft to turn turning wheels of a vehicle, the steering control device comprising
 a control unit configured to control a target control value serving as a target of a control value for controlling the motor torque of the motor,
 wherein the control unit is configured to:
  perform compensation for the target control value;
  acquire an offset value; and
  change the target control value such that the acquired offset value decreases gradually, and
 wherein:
  the control unit is configured to perform the compensation such that the target control value is shifted into an output limit of the motor, when the target control value exceeding the output limit is calculated; and
  the control unit is configured to acquire an excess control value that is a control value corresponding to an excess over the output limit of the motor, as the offset value that is an amount by which the target control value is shifted through the compensation, when the target control value exceeding the output limit is calculated.

2. The steering control device according to claim 1, wherein:
 the control unit is configured to be able to switch between a plurality of control states including a first control state in which a first target control value acquired under a predetermined condition is controlled and a second control state in which a second target control value acquired under a condition different from the predetermined condition of the first target control value is controlled, and to perform the compensation such that a post-switching target control value controlled in a post-switching control state is shifted toward a pre-switching target control value controlled in a pre-switching control state after the control state has been switched; and
 the control unit is configured to acquire a difference in the target control value between before and after switching of the control state, as the offset value that is an amount by which the target control value is shifted through the compensation, when the control state is switched.

3. The steering control device according to claim 2, wherein:
 the first target control value is calculated under the condition in which a first state variable detected by a first detection device is used;
 the second target control value is calculated under the condition in which a second state variable detected by a second detection device is used; and
 the first detection device and the second detection device are redundant detection devices that respectively detect independent state variables of a same detection target.

4. The steering control device according to claim 1, wherein:
 the output limit is a value associated with an angular velocity of the motor that is acquired from a relationship with the motor torque of the motor;
 the target control value is a value associated with a state variable that is able to be converted to the angular velocity of the motor; and
 the control unit is configured to acquire, as the offset value, the excess control value acquired from a difference between the output limit of the motor and a change amount of the target control value, when the target control value exceeding the output limit is calculated.

5. The steering control device according to claim 1, wherein the control unit is configured to change a decrease value for decreasing the offset value based on at least one of a traveling state of the vehicle and a turning state of the turning mechanism.

6. The steering control device according to claim 5, wherein the control unit is configured to decrease the offset value by at least a minimum value regardless of the traveling state of the vehicle and the turning state of the turning mechanism, when there is the offset value.

7. The steering control device according to claim 1, wherein:
 the control unit is configured to perform the compensation such that the target control value is shifted to decrease the motor torque of the motor, when a vehicle power supply is switched from an off state to an on state; and
 the control unit is configured to acquire a control value corresponding to an amount by which the turning wheels are to be turned in a first cycle after the vehicle power supply is switched from the off state to the on state, as the offset value that is an amount by which the target control value is shifted through the compensation, when the vehicle power supply is switched from the off state to the on state.

8. A steering control device configured to control a steering system including a turning mechanism that includes a motor configured to generate a motor torque that serves as power for moving a turning shaft to turn turning wheels of a vehicle, the steering control device comprising
 a control unit configured to control a target control value serving as a target of a control value for controlling the motor torque of the motor,
 wherein the control unit is configured to:
  perform compensation for the target control value;
  acquire an offset value; and
  change the target control value such that the acquired offset value decreases gradually, and
 wherein:
  the control unit is configured to perform the compensation such that the target control value is shifted to decrease the motor torque of the motor, when a vehicle power supply is switched from an off state to an on state; and
  the control unit is configured to acquire a control value corresponding to an amount by which the turning wheels are to be turned in a first cycle after the vehicle power supply is switched from the off state to the on state, as the offset value that is an amount by which the target control value is shifted through the compensation, when the vehicle power supply is switched from the off state to the on state.

9. The steering control device according to claim 8, wherein:
the steering system further includes a steering shaft configured such that a power transmission path between the steering shaft and the turning wheels is cut off, the steering shaft being configured to rotate in accordance with an operation of a steering wheel;
the target control value is a target angle that is calculated as a value of a turning correlation angle having a correlation with a turning angle of the turning wheels at which a positional relationship with a steering angle that is a rotation angle of the steering shaft satisfies a predetermined correspondence; and
the control unit is configured to acquire, as the offset value, a starting shift value that is a difference between a value of the turning correlation angle acquired to satisfy the predetermined correspondence based on the steering angle in the first cycle after the vehicle power supply is switched from the off state to the on state and a value of the turning correlation angle acquired based on an actual turning angle.

10. The steering control device according to claim 9, wherein the predetermined correspondence is a steering angle ratio that is a ratio of the turning angle to the steering angle, and the predetermined correspondence varies based on a traveling state of the vehicle.

11. The steering control device according to claim 8, wherein:
the control unit is configured to be able to switch between a plurality of control states including a first control state in which a first target control value acquired under a predetermined condition is controlled and a second control state in which a second target control value acquired under a condition different from the predetermined condition of the first target control value is controlled, and to perform the compensation such that a post-switching target control value controlled in a post-switching control state is shifted toward a pre-switching target control value controlled in a pre-switching control state after the control state has been switched; and
the control unit is configured to acquire a difference in the target control value between before and after switching of the control state, as the offset value that is an amount by which the target control value is shifted through the compensation, when the control state is switched.

12. The steering control device according to claim 11, wherein:
the first target control value is calculated under the condition in which a first state variable detected by a first detection device is used;
the second target control value is calculated under the condition in which a second state variable detected by a second detection device is used; and
the first detection device and the second detection device are redundant detection devices that respectively detect independent state variables of a same detection target.

13. A steering control device configured to control a steering system including a turning mechanism that includes a motor configured to generate a motor torque that serves as power for moving a turning shaft to turn turning wheels of a vehicle, the steering control device comprising
a control unit configured to control a target control value serving as a target of a control value for controlling the motor torque of the motor,
wherein the control unit is configured to:
perform compensation for the target control value;
acquire an offset value; and
change the target control value such that the acquired offset value decreases gradually,
wherein the control unit is configured to change a decrease value for decreasing the offset value based on at least one of a traveling state of the vehicle and a turning state of the turning mechanism, and
wherein the control unit is configured to decrease the offset value by at least a minimum value regardless of the traveling state of the vehicle and the turning state of the turning mechanism, when there is the offset value.

14. The steering control device according to claim 13, wherein:
the control unit is configured to be able to switch between a plurality of control states including a first control state in which a first target control value acquired under a predetermined condition is controlled and a second control state in which a second target control value acquired under a condition different from the predetermined condition of the first target control value is controlled, and to perform the compensation such that a post-switching target control value controlled in a post-switching control state is shifted toward a pre-switching target control value controlled in a pre-switching control state after the control state has been switched; and
the control unit is configured to acquire a difference in the target control value between before and after switching of the control state, as the offset value that is an amount by which the target control value is shifted through the compensation, when the control state is switched.

15. The steering control device according to claim 14, wherein:
the first target control value is calculated under the condition in which a first state variable detected by a first detection device is used;
the second target control value is calculated under the condition in which a second state variable detected by a second detection device is used; and
the first detection device and the second detection device are redundant detection devices that respectively detect independent state variables of a same detection target.

* * * * *